United States Patent
Ohno et al.

(10) Patent No.: US 12,366,839 B2
(45) Date of Patent: Jul. 22, 2025

(54) TIMING PREDICTION METHOD, TIMING PREDICTION DEVICE, TIMING PREDICTION SYSTEM, PROGRAM, AND CONSTRUCTION MACHINERY SYSTEM

(71) Applicant: TOHOKU UNIVERSITY, Sendai (JP)

(72) Inventors: Kazunori Ohno, Sendai (JP); Kento Yamada, Sendai (JP); Ryunosuke Hamada, Sendai (JP)

(73) Assignee: TOHOKU UNIVERSITY, Sendai (JP)

( * ) Notice: Subject to any disclaimer, the term of this patent is extended or adjusted under 35 U.S.C. 154(b) by 330 days.

(21) Appl. No.: 17/998,986

(22) PCT Filed: May 24, 2021

(86) PCT No.: PCT/JP2021/019585
§ 371 (c)(1),
(2) Date: Nov. 16, 2022

(87) PCT Pub. No.: WO2021/241487
PCT Pub. Date: Dec. 2, 2021

(65) Prior Publication Data
US 2023/0213908 A1 Jul. 6, 2023

(30) Foreign Application Priority Data
May 25, 2020 (JP) ................................ 2020-090968

(51) Int. Cl.
*G05B 19/042* (2006.01)
(52) U.S. Cl.
CPC .... *G05B 19/042* (2013.01); *G05B 2219/2616* (2013.01)
(58) Field of Classification Search
USPC ......................................................... 700/28
See application file for complete search history.

(56) References Cited

U.S. PATENT DOCUMENTS

2007/0168100 A1* 7/2007 Danko .................. B25J 9/1628
701/50
2009/0016599 A1* 1/2009 Eaton .................... G06N 3/044
382/159
(Continued)

FOREIGN PATENT DOCUMENTS

| CN | 110276784 A | 9/2019 |
| JP | 2019052499 A | 4/2019 |

(Continued)

OTHER PUBLICATIONS

Keiji Nagatani et al., Toward Autonomous navigation for 6-wheeled dump trackfor Civil Engineering Works that Regional Contractors can Introduce, The 18thSystem Integration Division Annual Conference (SI2017), 2017, p. 1013-1016.
(Continued)

*Primary Examiner* — Mohammad Ali
*Assistant Examiner* — Joshua T Sanders
(74) *Attorney, Agent, or Firm* — Banner & Witcoff, Ltd.

(57) ABSTRACT

Movement data of a plurality of positions on an observation object performing a predetermined movement action is acquired, feature data is generated by performing frequency analysis on the movement data, a transition sequence of a primitive action is extracted by segmenting the feature data, and based on the transition sequence and an action model obtained by learning a transition sequence of a primitive action obtained by segmenting a movement state of a training object performing a movement action, an occurrence rate of the primitive action in the predetermined movement action is analyzed to extract a pattern of the primitive action, thereby predicting an end timing of the predetermined movement action.

10 Claims, 12 Drawing Sheets

(56) References Cited

U.S. PATENT DOCUMENTS

| | | | |
|---|---|---|---|
| 2014/0371871 A1* | 12/2014 | Farina | A61F 2/54 623/24 |
| 2015/0322647 A1* | 11/2015 | Danko | G05B 13/021 700/275 |
| 2020/0042836 A1* | 2/2020 | Okada | G06F 18/295 |
| 2020/0131737 A1* | 4/2020 | Suzuki | E02F 3/435 |

FOREIGN PATENT DOCUMENTS

| | | |
|---|---|---|
| JP | 2019208629 A | 12/2019 |
| JP | 2020021292 A | 2/2020 |

OTHER PUBLICATIONS

Kazunori Ohno et al., Measurement of Cooperative Tasks of Six Wheels DumpTruck and Backhoe, conference on Robotics Mechatronics, 2A2-B06, 2018 (including English language abstract).
Kento Yamada et al., Prediction of Backhoe Loading Behavior Using Non-Parametric Bayes Hidden Markov Model, 1P2-D08, 2019 JSME Conference onRobotics and Mechatronics, 2019.
Aug. 10, 2021—(WO) International Search Report—App PCT/JP2021/019585.

* cited by examiner

[FIG. 1]
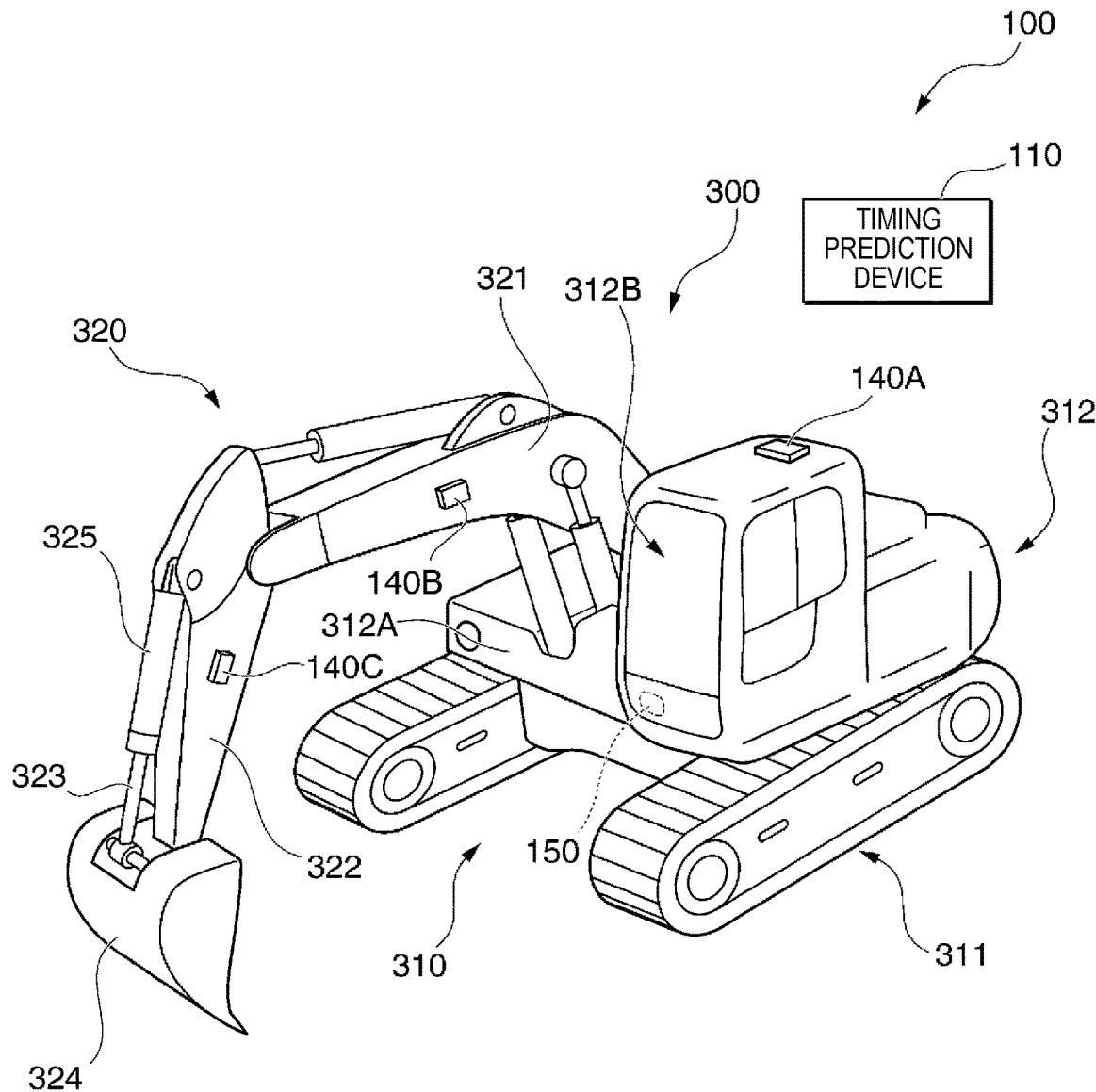

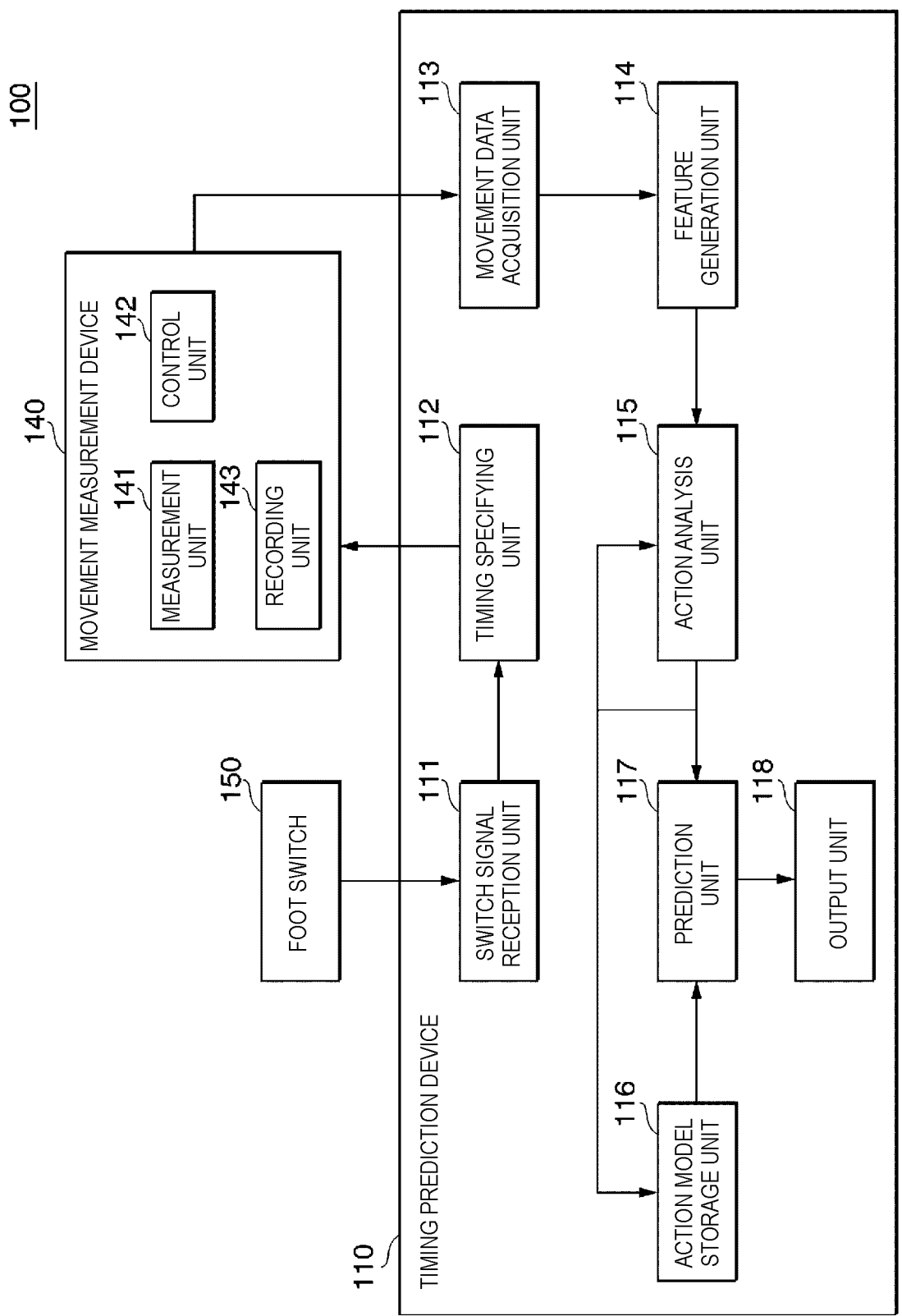
[FIG. 2]

[FIG. 3]
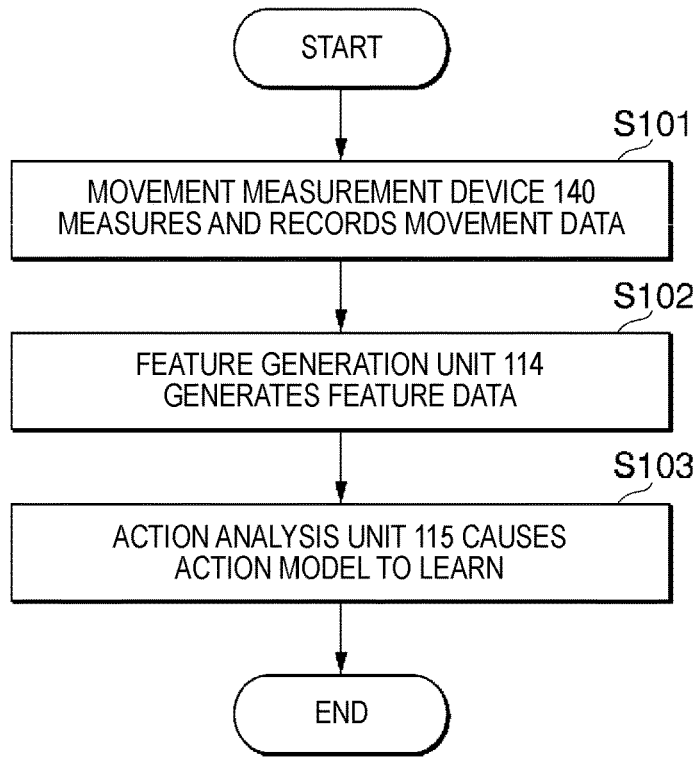
[FIG. 4A]
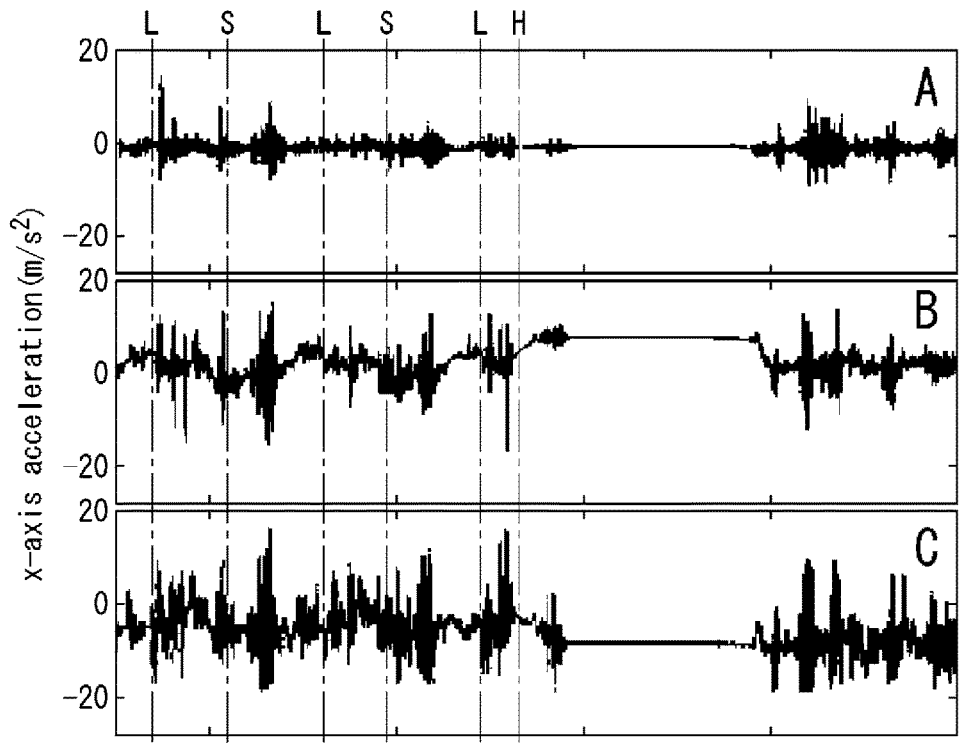

[FIG. 4B]
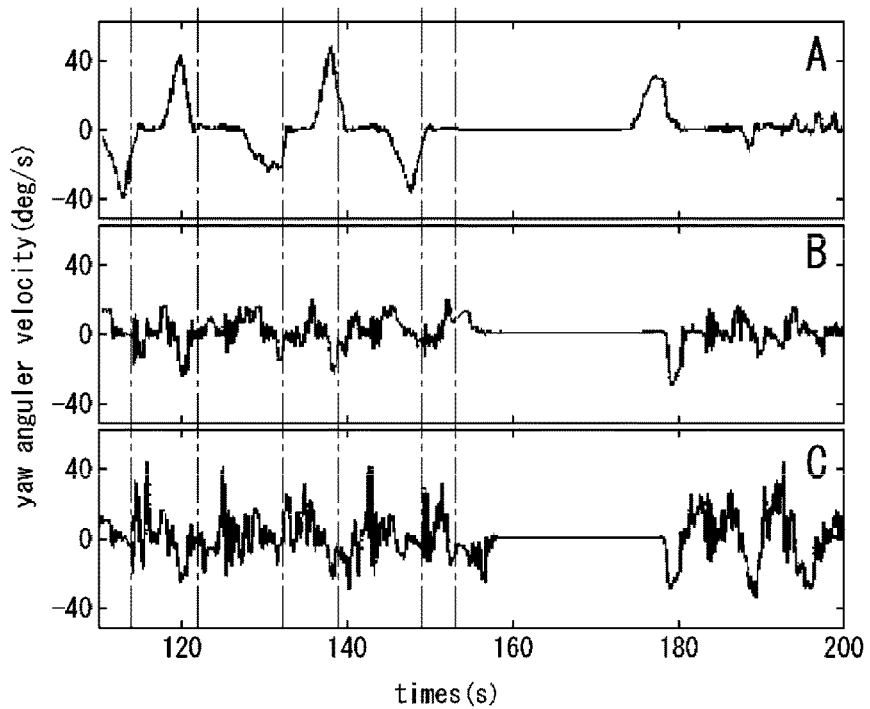
[FIG. 5]
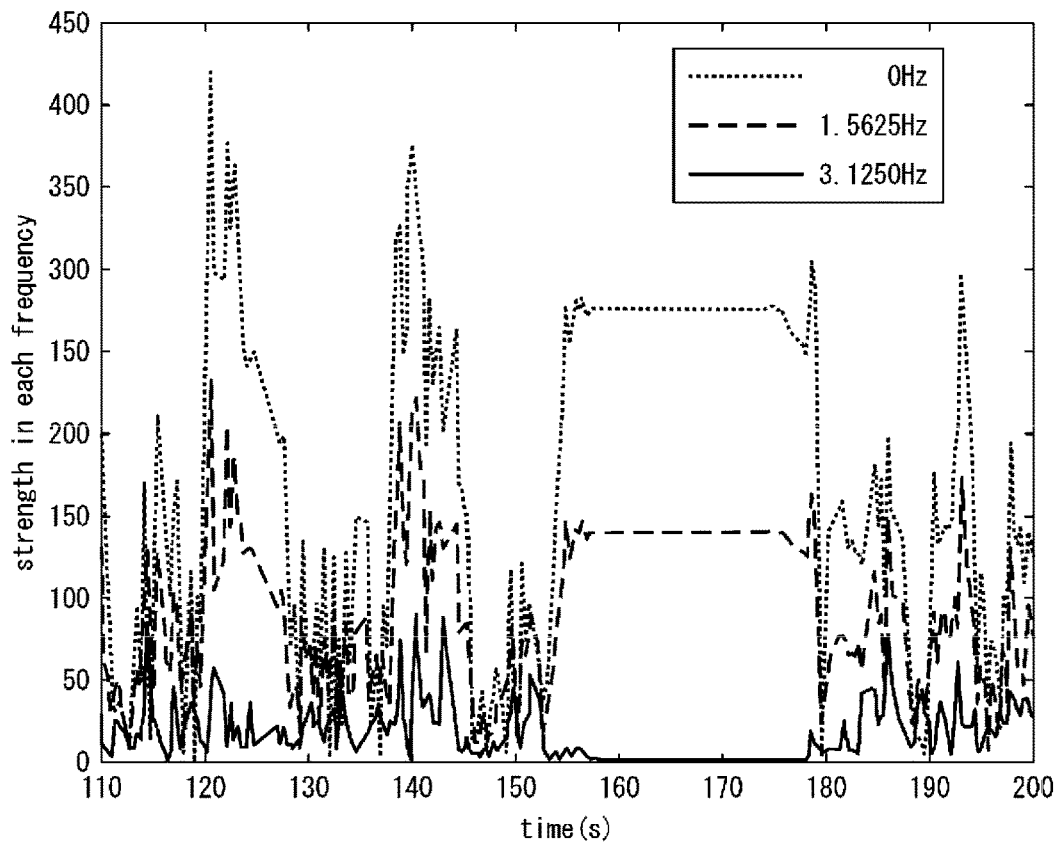

[FIG. 6]
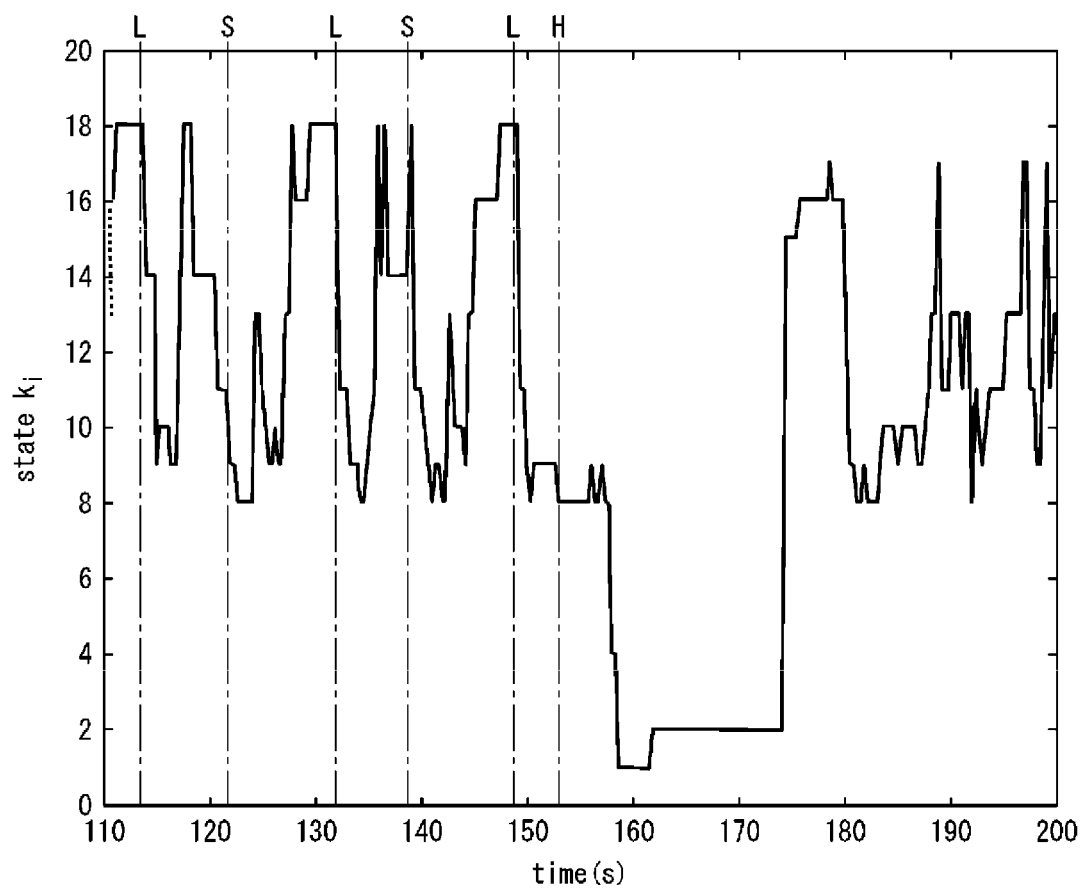

[FIG. 7]
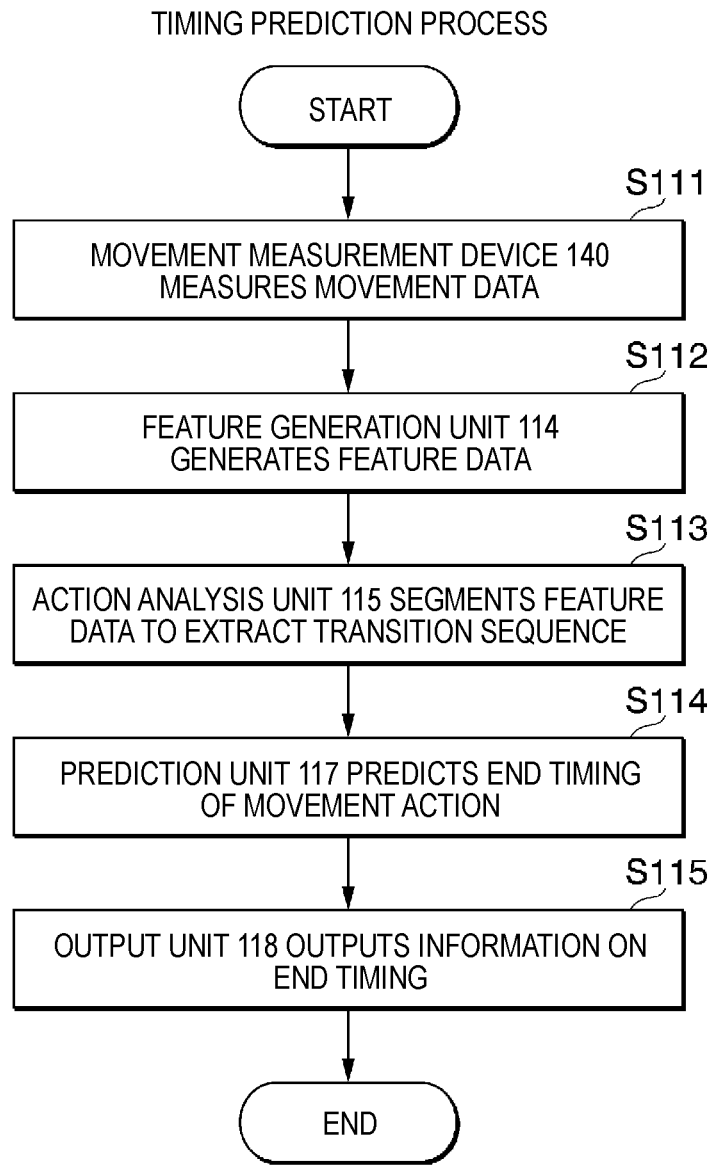

[FIG. 8]
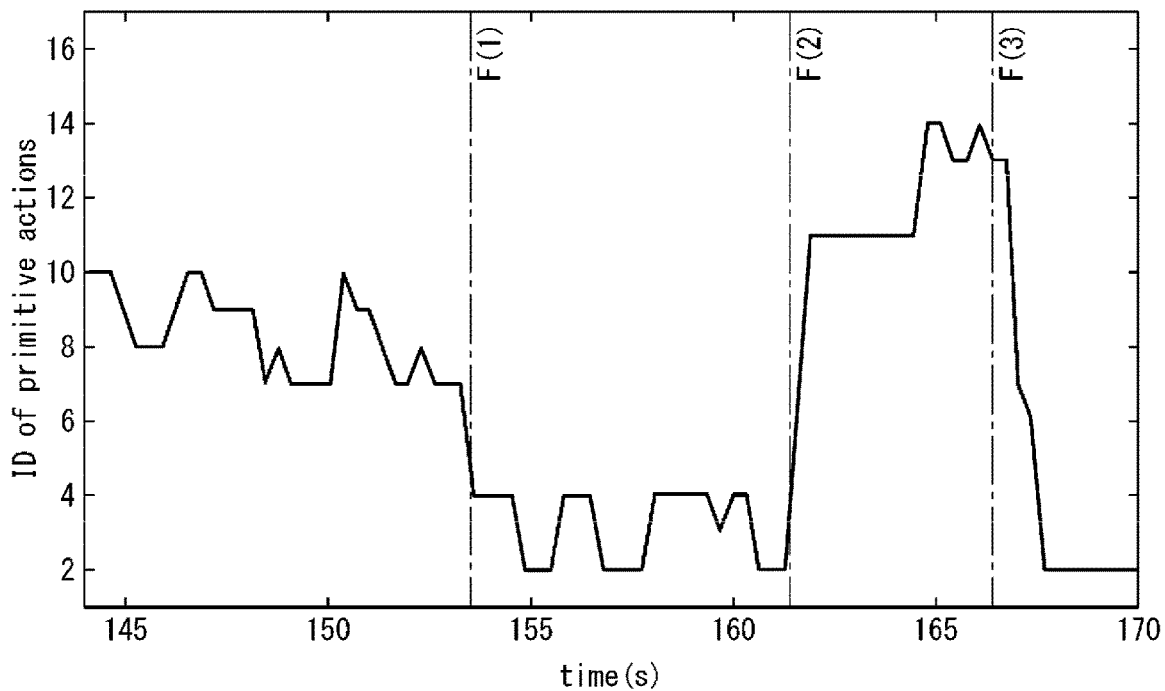
[FIG. 9]
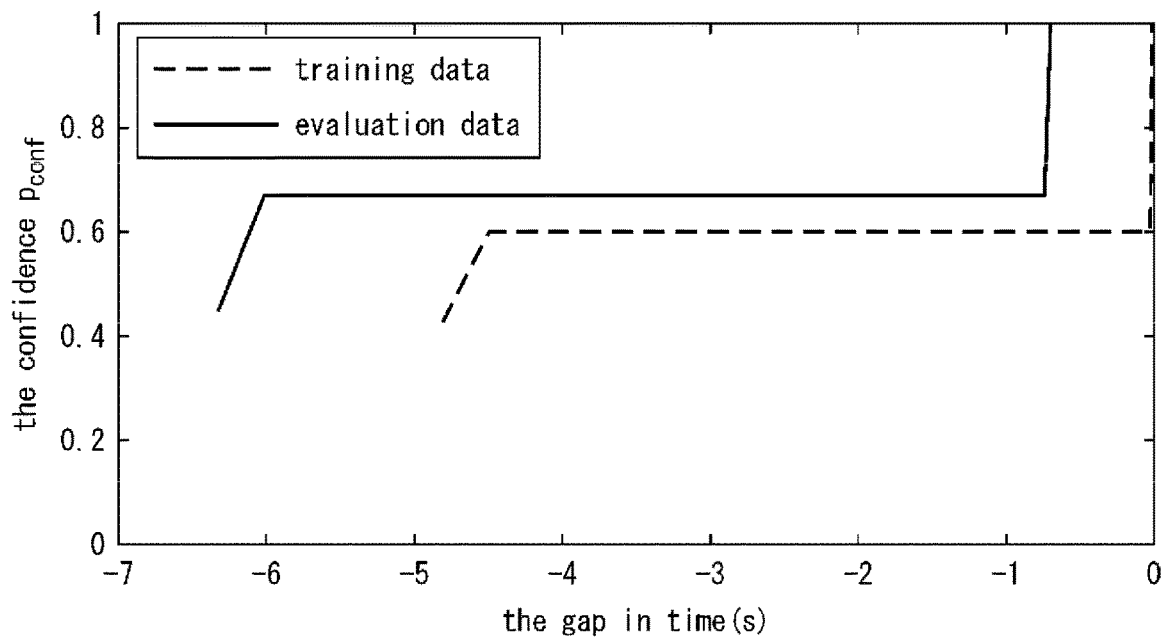

[FIG. 10]
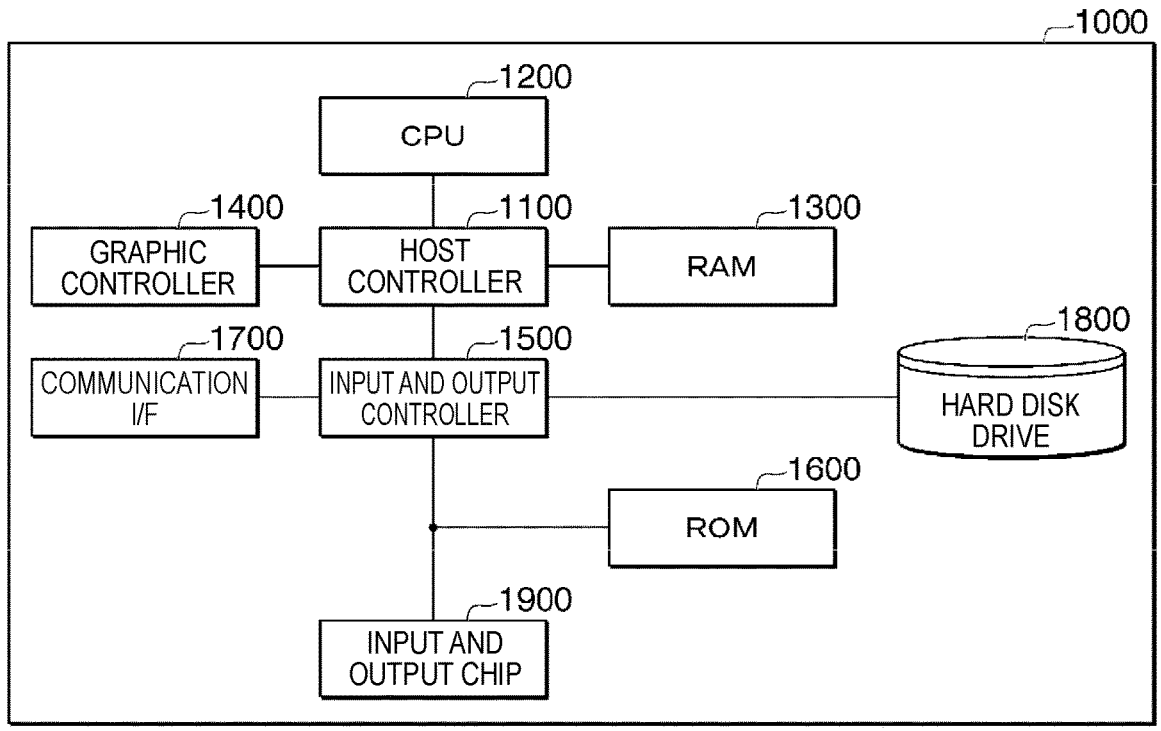
[FIG. 11]
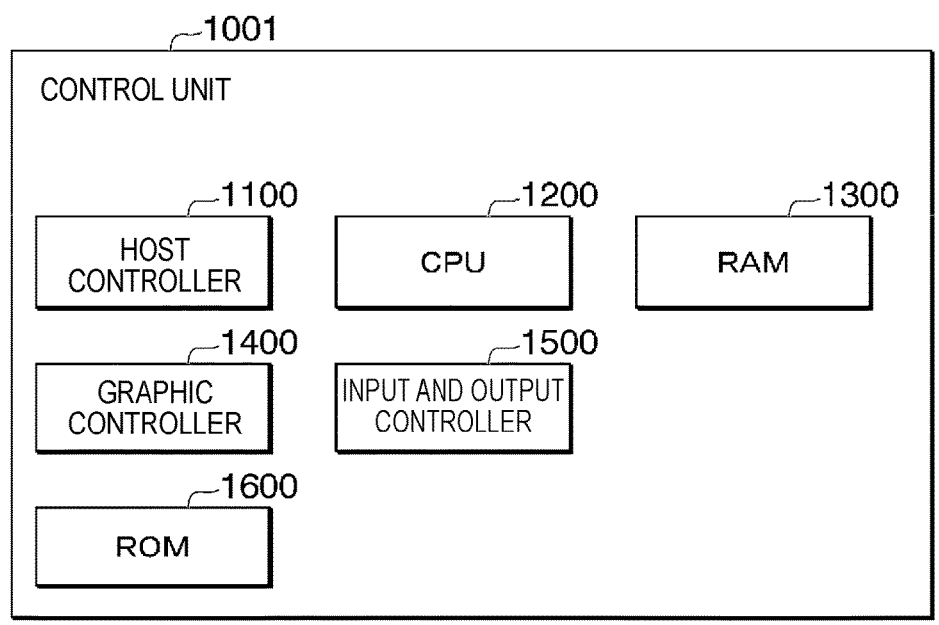

[FIG. 12]
D101
| DATA SET | A | | B | | C | | D | |
|---|---|---|---|---|---|---|---|---|
| FEATURE DATA | $D_3$ | $D_{18}$ | $D_3$ | $D_{18}$ | $D_3$ | $D_{18}$ | $D_3$ | $D_{18}$ |
| CONFIDENCE | 1.0 | 1.0 | 1.0 | 1.0 | 0.75 | 0.75 | 1.0 | 0.75 |
D102
| DATA SET | A | | B | | C | | D | |
|---|---|---|---|---|---|---|---|---|
| FEATURE DATA | $D_3$ | $D_{18}$ | $D_3$ | $D_{18}$ | $D_3$ | $D_{18}$ | $D_3$ | $D_{18}$ |
| CONFIDENCE | 1.0 | 0.80 | 1.0 | 0.60 | 1.0 | 0.80 | 1.0 | 0.50 |
D103
| DATA SET | A | B | C | D |
|---|---|---|---|---|
| FEATURE DATA | $D_3$ | $D_3$ | $D_3$ | $D_3$ |
| CONFIDENCE | 1.0 | 0.80 | 1.0 | 0.80 |
[FIG. 13]
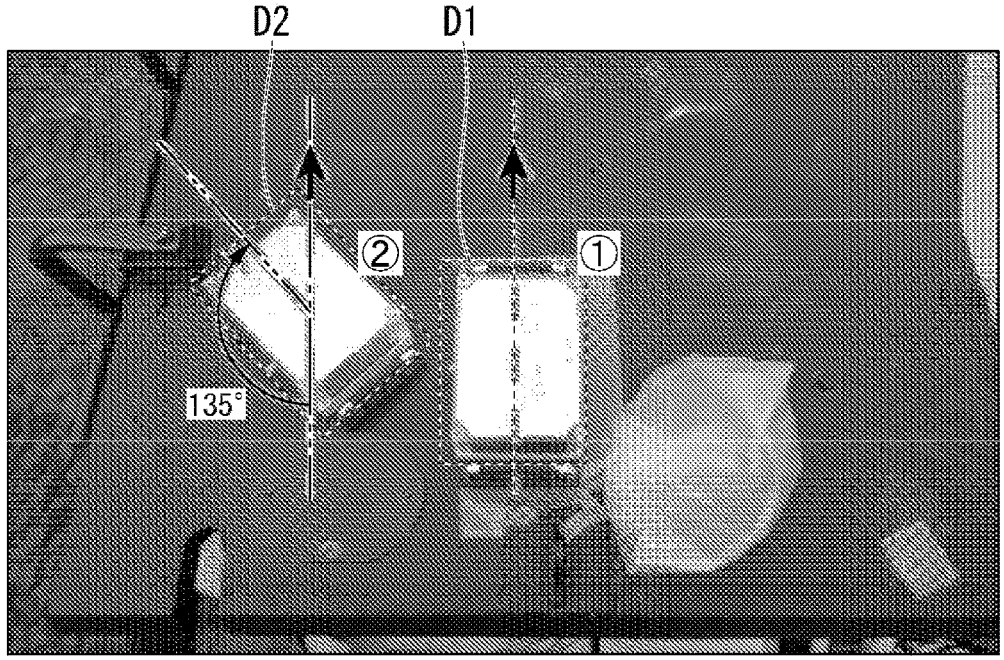

[FIG. 14]
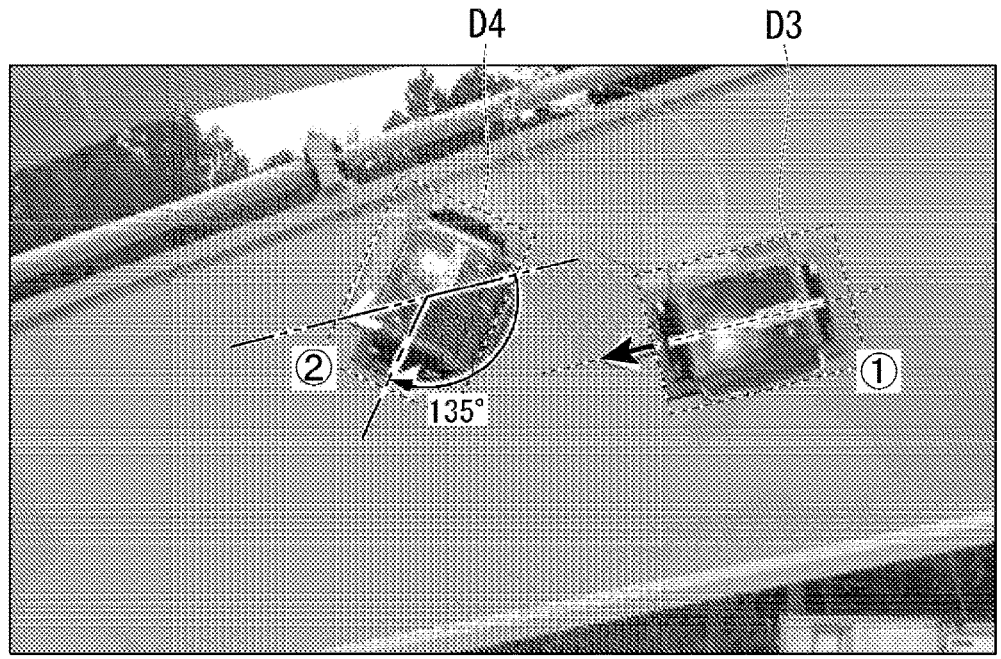
[FIG. 15]
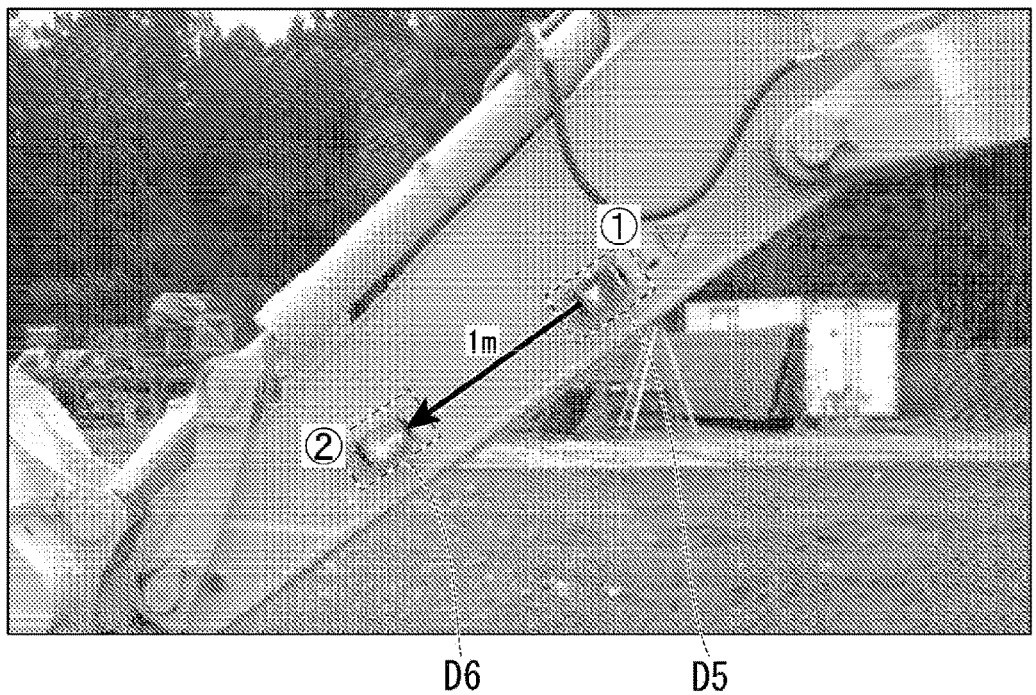
[FIG. 16]
| DATA SET | A | B | C | D |
|---|---|---|---|---|
| CONFIDENCE | 1.0 | 1.0 | 1.0 | 1.0 |

[FIG. 17]
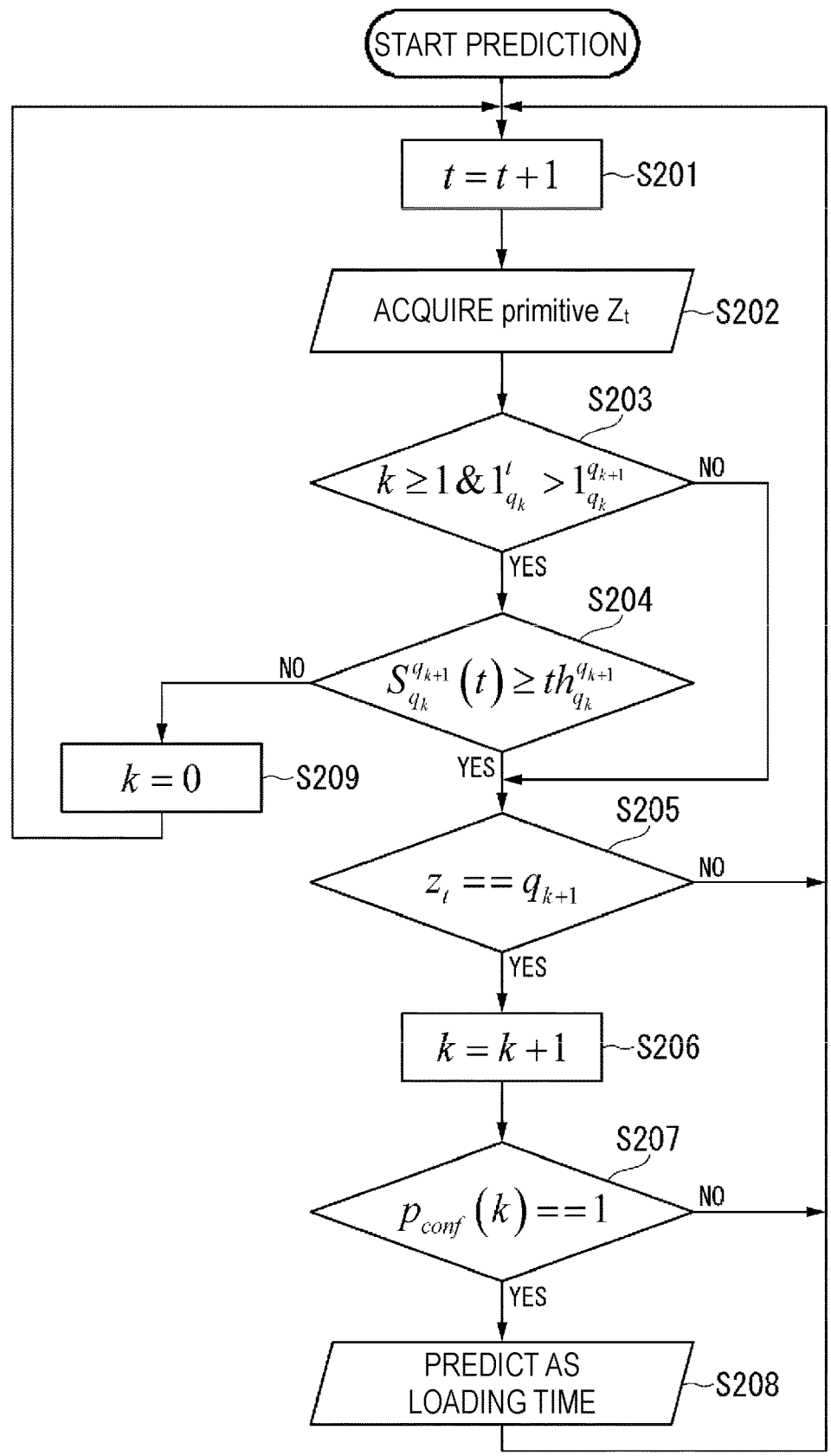

[FIG. 18]

| METHOD | ACCURACY | REPRODUCTION RATE | CONFIDENCE |
|---|---|---|---|
| TIMING PREDICTION DEVICE | 1.0 | 0.94 | 0.93 |
| THRESHOLD METHOD | 0.46 | 1.0 | 0.46 |
| LSTM (pattern recognition) | 0.46 | 0.94 | 0.43 |
| LSTM (regression prediction) | 0.47 | 0.44 | 0.29 |

TIMING PREDICTION METHOD, TIMING PREDICTION DEVICE, TIMING PREDICTION SYSTEM, PROGRAM, AND CONSTRUCTION MACHINERY SYSTEM

CROSS-REFERENCE TO RELATED APPLICATIONS

This application is a U.S. National Stage application under 35 U.S.C. § 371 of International Application PCT/JP2021/019585 (published as WO/2021/241487 A1), filed May 24, 2021, which claims the benefit of priority to Application JP 2020-090968, filed May 25, 2020. Benefit of the filing date of these prior applications is hereby claimed. Each of these prior applications is hereby incorporated by reference in its entirety.

TECHNICAL FIELD

The present invention relates to a timing prediction method, a timing prediction device, a timing prediction system, a program, and a construction machinery system.

The present application claims priority based on Japanese Patent Application No. JP-A-2020-090968 filed on May 25, 2020, and contents thereof are incorporated by reference.

BACKGROUND ART

In a field of civil engineering, research is conducted to automate work of loading earth and sand scooped by a backhoe using a bucket onto a dump truck. According to this type of research, it is possible to analyze actions of the backhoe and the dump truck, and predict a relationship between stop positions when the work of loading earth and sand is performed (for example, refer to Non-PTL 1 and Non-PTL 2).

CITATION LIST

Non-Patent Literature

Non-PTL 1: Keiji Nagatani, Yota Konno, Kazunori Ohno, Takahiro Suzuki, Taro Suzuki, Yukinori Shibata, Kimitaka Asano, Tomohiro Komatsu, Yuji Oguri, "Research and development on automatic driving of six-wheeled dump trucks that can be introduced by small and medium-sized construction companies", 18th System Integration Division Lecture (SI2017), 2017, p. 1013 to 1016

Non-PTL 2: Kazunori Ohno, Ryunosuke Hamada, Naoki Mizuno, Shunpei Yamaguchi, Tatsuya Hoshi, Taro Suzuki, Yukinori Shibata, Kimitaka Asano, Takahiro Suzuki, Satoshi Tadokoro, "Measurement of cooperative work between six-wheeled dump truck and backhoe", Robotics Mechatronics Lecture 218 June 2018, p. 2A2-B06(1) to 2A2-B06(3)

SUMMARY OF INVENTION

Technical Problem

In order to implement the automation of the loading work from the backhoe to the dump truck, it is necessary not only to predict the stop position of the dump truck with respect to that of the backhoe, but also to predict a timing at which the backhoe completes loading preparation. That is, it is desired to develop a technique for predicting an end timing of a predetermined movement action of an object performing a movement action.

Solution to Problem

According to a first aspect of the invention, a timing prediction method is provided. The timing prediction method may include acquiring movement data of a plurality of positions on an observation object performing a predetermined movement action. The timing prediction method may include generating feature data by performing frequency analysis on the acquired movement data. The timing prediction method may include segmenting the generated feature data to extract a transition sequence of a primitive action. The timing prediction method may include predicting an end timing of the predetermined movement action by analyzing an occurrence rate of the primitive action in the predetermined movement action and extracting a pattern of the primitive action based on the extracted transition sequence and an action model obtained by learning a transition sequence of a primitive action obtained by segmenting a movement state of a training object performing a movement action.

In the above-described timing prediction method, the predetermined movement action performed by the observation object may be divided into a plurality of actions, for each divided action, the occurrence rate of the primitive action in the action may be analyzed to extract the pattern of the primitive action based on the extracted transition sequence and the action model, the extracted pattern may be evaluated in stages to calculate a confidence, and the end timing of the predetermined movement action may be predicted according to the calculated confidence.

In the above-described timing prediction method, by performing the frequency analysis on the acquired movement data, a frequency band including a frequency component generated due to the predetermined movement action may be selected, and the feature data may be generated in the selected frequency band.

In the above-described timing prediction method, a Hidden Markov Model may be applied to the action model, and the transition sequence of the primitive action may be extracted by segmenting the feature data by a calculation process to which the Hidden Markov Model is applied.

In the above-described timing prediction method, the movement data may include angular velocity data and acceleration data.

According to a second aspect of the invention, a timing prediction device is provided. The timing prediction device may include an action model storage unit configured to store an action model obtained by learning a transition sequence of a primitive action obtained by segmenting a movement state of a training object performing a movement action. The timing prediction device may include a movement data acquisition unit configured to acquire movement data of a plurality of positions on an observation object performing a predetermined movement action. The timing prediction device may include a feature generation unit configured to generate feature data by performing frequency analysis on the movement data acquired by the movement data acquisition unit. The timing prediction device may include an action analysis unit configured to segment the feature data generated by the feature generation unit to extract a transition sequence of a primitive action. The timing prediction device may include a prediction unit configured to predict an end timing of the predetermined movement action by analyzing an occurrence rate of the primitive action in the predetermined movement action and extracting a pattern of the primitive action based on the transition sequence extracted by the action analysis unit and the action model stored in the action model storage unit.

According to a third aspect of the invention, a timing prediction system is provided. The timing prediction system may include a movement measurement device configured to measure movement data of a plurality of positions on an observation object performing a predetermined movement action, and a timing prediction device. The timing prediction device may include an action model storage unit configured to store an action model obtained by learning a transition sequence of a primitive action obtained by segmenting a movement state of a training object performing a movement action. The timing prediction device may include a movement data acquisition unit configured to acquire the movement data from the movement measurement device. The timing prediction device may include a feature generation unit configured to generate feature data by performing frequency analysis on the movement data acquired by the movement data acquisition unit. The timing prediction device may include an action analysis unit configured to segment the feature data generated by the feature generation unit to extract a transition sequence of a primitive action. The timing prediction device may include a prediction unit configured to predict an end timing of the predetermined movement action by analyzing an occurrence rate of the primitive action in the predetermined movement action and extracting a pattern of the primitive action based on the transition sequence extracted by the action analysis unit and the action model stored in the action model storage unit.

According to a fourth aspect of the invention, a program is provided. The program may cause a computer including an action model storage unit that stores an action obtained by learning a transition sequence of a model primitive action obtained by segmenting a movement state of a training object performing a movement action to perform processes. The computer may execute acquiring movement data of a plurality of positions on an observation object performing a predetermined movement action. The computer may execute generating feature data by performing frequency analysis on the acquired movement data. The computer may execute segmenting the generated feature data to extract a transition sequence of a primitive action. The computer may execute predicting an end timing of the predetermined movement action by analyzing an occurrence rate of the primitive action in the predetermined movement action and extracting a pattern of the primitive action based on the extracted transition sequence and the action model stored in the action model storage unit.

According to a fifth aspect of the invention, construction machinery system is provided. The construction machinery system may include a movement measurement device configured to measure movement data of a plurality of positions on a construction machine performing a predetermined movement action, and a timing prediction device. The timing prediction device may include an action model storage unit configured to store an action model obtained by learning a transition sequence of a primitive action obtained by segmenting a movement state of a training construction machine performing a movement action. The timing prediction device may include a movement data acquisition unit configured to acquire the movement data from the movement measurement device. The timing prediction device may include a feature generation unit configured to generate feature data by performing frequency analysis on the movement data acquired by the movement data acquisition unit. The timing prediction device may include an action analysis unit configured to segment the feature data generated by the feature generation unit and extract a transition sequence of a primitive action. The timing prediction device may include a prediction unit configured to predict an end timing of the predetermined movement action by analyzing an occurrence rate of the primitive action in the predetermined movement action and extracting a pattern of the primitive action based on the transition sequence extracted by the action analysis unit and the action model stored in the action model storage unit.

It should be noted that the above summary of the invention does not enumerate all the features necessary for the invention. A sub-combination of the features described above may also be the invention.

Advantageous Effect

According to the above aspects of the invention, it is possible to predict an end timing of a predetermined movement action of an object performing a movement action.

BRIEF DESCRIPTION OF DRAWINGS

FIG. 1 is a diagram schematically showing an example of a timing prediction system 100.

FIG. 2 is a diagram showing an example of a schematic functional configuration of the timing prediction system 100.

FIG. 3 is a flowchart showing an example of a schematic procedure of a learning process of an action model executed by the timing prediction system 100.

FIG. 4A is a first graph showing an example of movement data recorded by a recording unit 143 of a movement measurement device 140. The graph is a graph of x-axis acceleration data with respect to an elapsed time for each of a movement measurement device 140A, a movement measurement device 140B, and a movement measurement device 140C.

FIG. 4B is a second graph showing an example of the movement data recorded by the recording unit 143 of the movement measurement device 140. The graph is a graph of angular velocity data on a yaw angle with respect to the elapsed time for each of the movement measurement device 140A, the movement measurement device 140B, and the movement measurement device 140C.

FIG. 5 is a graph showing an example of frequency strengths obtained by a feature generation unit 114 executing a fast Fourier transform process.

FIG. 6 is a graph showing an example of a transition of a primitive action in an action model stored in an action model storage unit 116.

FIG. 7 is a flowchart that is executed by the timing prediction system 100 and shows an example of a schematic procedure of a timing prediction process in an actual action.

FIG. 8 is a graph showing an example of a transition of a primitive action in an action model trained based on training movement amount data.

FIG. 9 is a graph showing an example of a relationship between a time prior to an end timing of a preparatory work action and a confidence.

FIG. 10 is a diagram showing an example of a schematic hardware configuration of a computer 1000 functioning as a timing prediction device 110.

FIG. 11 is a diagram showing an example of a configuration of a control unit 1001 according to a modification.

FIG. 12 is a diagram showing an example of an experimental result of a first evaluation experiment according to the modification.

FIG. 13 is a first schematic diagram illustrating a second evaluation experiment according to the modification.

FIG. 14 is a second schematic diagram illustrating the second evaluation experiment according to the modification.

FIG. 15 is a third schematic diagram illustrating the second evaluation experiment according to the modification.

FIG. 16 is a diagram showing an example of an experimental result of the second evaluation experiment according to the modification.

FIG. 17 is a flowchart illustrating an example of a flow of processes executed in a pattern acquisition process, a confidence acquisition process, and a loading timing estimation process according to the modification.

FIG. 18 is a diagram showing an example of an experimental result of a third evaluation experiment according to the modification.

DESCRIPTION OF EMBODIMENTS

Hereinafter, the invention will be described through an embodiment of the invention, but the following embodiment does not limit the invention according to the claims. In addition, all combinations of features described in the embodiment are not necessarily indispensable to the solution of the invention.

In the embodiment, a backhoe steered by an occupant is a construction machine that performs a series of work including leveling work such as leveling around the backhoe itself and sorting of earth and sand, scooping earth and sand, and loading the scooped earth and sand onto a dump truck in the vicinity of the backhoe itself.

In the present embodiment, a timing prediction method, a timing prediction device, a timing prediction system, a program, and a construction machinery system of a backhoe for predicting an end timing of a movement action (hereinafter, referred to as a preparatory work action) from when earth and sand is scooped after the leveling work to when preparation for loading the scooped earth and sand onto a dump truck is completed will be described.

FIG. 1 is a diagram schematically showing an example of a timing prediction system 100. The timing prediction system 100 is a system that predicts an end timing of a preparatory work action in a backhoe 300 that performs various movement actions.

As shown in FIG. 1, the backhoe 300 is provided with a backhoe attachment 320 in a main body 310. The backhoe 300 scoops an object to be scooped, such as earth and sand, while drawing a bucket 324 attached to a tip end of the backhoe attachment 320 to a main body 310 side, and performs work of loading the scooped object onto a dump truck (not shown).

The main body 310 is formed by attaching an upper swiveling body 312 to a lower traveling body 311. The lower traveling body 311 is a lower mechanism of the backhoe 300 and has a traveling function of moving the backhoe itself and a function of supporting the upper swiveling body 312. The upper swiveling body 312 is a part of the backhoe 300 and includes various mechanisms including a swiveling frame 312A and a cab 312B mounted on the swiveling frame 312A. The upper swiveling body 312 is swiveled by a swiveling device. The swiveling frame 312A is a frame on which various devices constituting the upper swiveling body 312 are mounted. The cab 312B is a control cabin provided in the upper swiveling body 312.

The backhoe attachment 320 includes a boom 321, an arm 322, a bucket link 323, and the bucket 324, and is mounted on the main body 310. The boom 321 is a support column that is attached to a front portion of the swiveling frame 312A by a pin and supports the arm 322, the bucket 324, and the like. The arm 322 is an arm that connects the bucket 324 and a tip end of the boom 321. The bucket link 323 is a link mechanism for operating the bucket 324 by a bucket cylinder 325. The bucket cylinder 325 is a hydraulic cylinder for operating the bucket 324. The bucket 324 is a container provided with a cutting blade or the like for directly excavating a construction object or scooping an object to be scooped.

The timing prediction system 100 includes a timing prediction device 110, a movement measurement device 140A, a movement measurement device 140B, a movement measurement device 140C, and a foot switch 150.

The movement measurement device 140A, the movement measurement device 140B, and the movement measurement device 140C (hereinafter, may be referred to as a movement measurement device 140 when the movement measurement device 140A, the movement measurement device 140B, and the movement measurement device 140C are not distinguished from one another) are devices that measure movement amounts and times. For example, the movement measurement device 140 detects rotational movements of three orthogonal axes and translational movements of the three orthogonal axes, and measures an angular velocity from the rotational movement and an acceleration from the translational movement. For example, the movement measurement device 140 measures ±250 [deg/s] as a measurement range of the angular velocity and an inertial movement amount of ±16 [G] as a measurement range of the acceleration in a measurement band of 200 [Hz]. A time measured by the movement measurement device 140 may be an elapsed time from a start of the measurement, or may be a time during the measurement. The movement measurement device 140 outputs movement data in which angular velocity data, acceleration data, and time information of each of the three axes are associated with one another.

For example, the movement measurement device 140 includes, as sensors, a gyroscope (gyro sensor) for measuring the angular velocity and an acceleration sensor for measuring the acceleration. An example of the movement measurement device 140 is an inertial measurement unit (IMU). Although details will be described later, the movement measurement device 140 can record movement data obtained by a measurement in the movement measurement device 140 itself.

A type, the number of dimensions, the measurement band, or the measurement range of the movement amount measured by the movement measurement device 140 is not limited to the above example. These specifications may be appropriately determined in accordance with a movement action, a cost, and the like of a training object, an observation object, a training construction machine or a construction machine.

Hereinafter, an example in which the movement measurement device 140 measures the angular velocity and the acceleration of each of the three orthogonal axes as the movement amount will be described.

The movement measurement device 140A is provided on a top surface of the cab 312B, and is communicably connected to the timing prediction device 110. When the movement measurement device 140A detects the movement amount such as when the upper swiveling body 312 swivels, the movement measurement device 140A records the detected movement data in the movement measurement device 140A itself. Alternatively, the movement measurement device 140A transmits the detected movement data to the timing prediction device 110.

The movement measurement device 140B is provided on a side surface of the boom 321, and is communicably connected to the timing prediction device 110. When the movement measurement device 140B detects the movement amount such as when the boom 321 is raised or lowered, the movement measurement device 140B records the detected movement data in the movement measurement device 140B itself. Alternatively, the movement measurement device 140B transmits the detected movement data to the timing prediction device 110.

The movement measurement device 140C is provided on a side surface of the arm 322, and is communicably connected to the timing prediction device 110. When the movement measurement device 140C detects the movement amount such as when the arm 322 is pushed out or pulled back, the movement measurement device 140C records the detected movement data in the movement measurement device 140C itself. Alternatively, the movement measurement device 140C transmits the detected movement data to the timing prediction device 110.

The foot switch 150 is provided on a floor surface of the cab 312B, and is communicably connected to the timing prediction device 110. When a foot of an occupant of the backhoe 300 performs a pressing operation, the foot switch 150 outputs a switch signal (for example, a pulse signal) indicating a timing at which the pressing operation is performed.

The foot switch 150 is an example of a switch, and instead of the foot switch 150, a button switch that outputs the switch signal by an operation of a hand or a finger of an occupant may be provided near a joystick of the cab 312B.

A posture of the backhoe 300 changes when the upper swiveling body 312, the boom 321, the arm 322, and the like operate during excavation, loading of earth and sand, or the like. The timing prediction device 110 predicts the end timing of the preparatory work action of the backhoe 300 by analyzing the movement data obtained from the movement measurement device 140 in time series with the change in posture of the backhoe 300.

The timing prediction device 110 may be provided at a location separated from the backhoe 300 within a range in which the timing prediction device 110 can communicate with the movement measurement device 140 and the foot switch 150, or may be mounted on the backhoe 300.

In the following description, the backhoe 300 is an example of the training object, the observation object, the training construction machine and the construction machine. Another specific example of the training object, the observation object, the training construction machine and the construction machine is a loading shovel. The backhoe 300 is a type of shovel in which scooping work is performed by moving the bucket 324 in a direction in which the bucket 324 is drawn toward the main body 310 side, and the loading shovel is a type of shovel in which a bucket is held in a facing forward manner and the scooping work is performed by moving the bucket in a pushing-out direction. As described above, a shovel may be a type of shovel in which movement of the bucket is different from that of the backhoe 300. In this manner, an object or a construction machine (including an excavating machine) that changes in posture may be used as the training object, the observation object, the construction machine, and the training construction machine.

FIG. 2 is a diagram showing an example of a schematic functional configuration of the timing prediction system 100. The timing prediction system 100 includes the timing prediction device 110, the movement measurement device 140, and the foot switch 150.

The timing prediction system 100 can operate by switching between a learning mode and an actual action mode. The learning mode is an action mode in which the timing prediction device 110 learns an action model to be described later using the training object or the training construction machine. In the learning mode, the timing prediction device 110 executes a learning process of the action model.

The actual action mode is an action mode in which the end timing of the preparatory work action is predicted using the observation object or the construction machine. In the actual action mode, the timing prediction device 110 executes a timing prediction process in actual actions.

As shown in FIG. 2, the timing prediction device 110 includes a switch signal reception unit 111, a timing specifying unit 112, a movement data acquisition unit 113, a feature generation unit 114, an action analysis unit 115, an action model storage unit 116, a prediction unit 117, and an output unit 118.

Although not shown in FIG. 2, the timing prediction device 110 may include a main body control unit that selects whether the timing prediction system 100 is operated in the learning mode or the actual action mode and controls the entire system in the selected action mode. For example, the main body control unit includes an interface that switches between the learning mode and the actual action mode by an operation of an operator from the outside or a remote operation by an information processing device.

When the switch signal reception unit 111 receives the switch signal transmitted from the foot switch 150, the switch signal reception unit 111 outputs switch information indicating that the switch signal is received to the timing specifying unit 112.

When the switch information is received from the switch signal reception unit 111, the timing specifying unit 112 outputs a timing specifying signal to the movement measurement device 140. In response to any action mode set by the main body control unit, the timing specifying unit 112 outputs a measurement start instruction signal indicating an instruction to start a measurement to the movement measurement device 140.

The movement data acquisition unit 113 acquires movement data from the movement measurement device 140 and outputs the acquired movement data to the feature generation unit 114. In the present embodiment, the movement data acquisition unit 113 acquires movement data for each of the cab 312B, the boom 321, and the arm 322 of the backhoe 300 performing a movement action, and outputs the acquired movement data to the feature generation unit 114.

The feature generation unit 114 performs frequency analysis on the movement data received from the movement data acquisition unit 113 to generates time-series feature data, and outputs the generated feature data to the action analysis unit 115.

The action analysis unit 115 segments the time-series feature data received from the feature generation unit 114 and extracts a transition sequence (also referred to as a state transition sequence) of a primitive action. The primitive action is an action as an element. The action analysis unit 115 segments the feature data based on, for example, a Hidden Markov Model (HMM), and extracts the transition sequence of the primitive action. Although the Hidden Markov Model is a method for segmenting a state, in the basic Hidden Markov Model, it is necessary to determine the number of states in advance. However, in the movement action of the backhoe 300 according to the present embodiment, there may be a difference in action for each occupant of the backhoe 300, such as a method of leveling around the backhoe 300 itself or a method of scooping earth and sand. That is, the number of segments in the preparatory work action may be different for each occupant. Therefore, as the Hidden Markov Model applied to the action analysis unit 115, there is a Non-Parametric Bayes Hidden Markov Model (NPHMM) capable of updating the number of segments of the state from an initial value.

As a method for extracting the transition sequence of the primitive action by segmenting the time-series feature data, for example, a Beta-Process Hidden Markov Model (BP-HMM) capable of estimating the primitive action by data-driven for each time-series may be applied to the action analysis unit 115.

In addition, a Hierarchical Dirichlet Process Hidden Markov Model (HMM) in which the number of states is not necessary to be determined in advance may be applied to the action analysis unit 115.

In addition, a convolutional neural network (CNN) may be applied to the action analysis unit 115, and the time-series feature data may be segmented to extract the transition sequence of the primitive action.

In the learning mode, the action analysis unit 115 inputs the transition sequence of the primitive action to the action model stored in the action model storage unit 116, and causes the action model to learn.

In the actual action mode, the action analysis unit 115 outputs the transition sequence of the primitive action to the prediction unit 117.

The action analysis unit 115 stores a learning result, merges the feature data received from the feature generation unit 114 and the stored learning result to perform analysis, and extracts the transition sequence of the primitive action.

The action model storage unit 116 stores the action model obtained by learning the transition sequence of the primitive action obtained by segmenting the movement state of the backhoe 300 (an example of the training object or the training construction machine) performing the movement action.

In the actual action mode, the prediction unit 117 analyzes an occurrence rate of the primitive action in the preparatory work action of the backhoe 300 based on the transition sequence received from the action analysis unit 115 and the action model stored in the action model storage unit 116, and extracts a pattern of the primitive action. Then, the prediction unit 117 predicts the end timing of the preparatory work action based on the extracted pattern of the primitive action. The prediction unit 117 outputs timing information indicating the predicted end timing to the output unit 118. The timing information includes, for example, information on a time prior to predicted end timing and a confidence.

In the actual action mode, the output unit 118 outputs the timing information received from the prediction unit 117 to the outside.

The movement measurement device 140 includes a measurement unit 141, a control unit 142, and a recording unit 143.

The measurement unit 141 measures a movement amount related to the movement measurement device 140 itself.

The control unit 142 controls the entire movement measurement device 140. In addition, the control unit 142 has a time counting function, measures an elapsed time from when the measurement start instruction signal is received from the timing specifying unit 112 of the timing prediction device 110, and acquires the time information. Alternatively, the control unit 142 may have a clock function and count a time to acquire the time information.

In the learning mode, under control of the control unit 142, the movement measurement device 140 records, in the recording unit 143, movement data in which the movement amount measured by the measurement unit 141 and time information obtained by counting the time are associated with each other. When the movement measurement device 140 receives the timing specifying signal from the timing specifying unit 112 of the timing prediction device 110, the control unit 142 records a timing at which the timing specifying signal is received in the recording unit 143. The recording unit 143 is implemented by, for example, a semiconductor memory device. The semiconductor memory device is a non-volatile memory in which data can be rewritten.

In the actual action mode, under the control of the control unit 142, the movement measurement device 140 outputs, to the timing prediction device 110, the movement data in which the movement amount measured by the measurement unit 141 and time information obtained by counting the time are associated with each other.

Next, actions of the timing prediction system 100 according to the present embodiment will be described separately for the learning process of the action model in the learning mode and the timing prediction process in the actual action mode.

[Learning Process of Action Model]

The learning process of the action model will be described. The backhoe 300 in the description of the present learning process is an example of the training object or the training construction machine. The occupant of the backhoe 300 performs training work (steering for training) for training the same movement action as that in actual work.

When the timing prediction device 110 and the movement measurement device 140 are powered on, the main body control unit of the timing prediction device 110 initializes the timing prediction device 110, and the control unit 142 of the movement measurement device 140 initializes the movement measurement device 140. When the main body control unit is set to the learning mode by an external operation, the main body control unit cooperates with the control unit 142 to execute the learning process of the action model.

FIG. 3 is a flowchart showing an example of a schematic procedure of the learning process of the action model executed by the timing prediction system 100.

The occupant of the backhoe 300 performs, as the training work, leveling work for leveling around the lower traveling body 311, preparatory work for scooping earth and sand by the bucket 324 and taking a posture of starting loading the earth and sand onto the dump truck, and sign work for notifying that the preparatory work is completed by a klaxon.

In this training work, the occupant performs an operation of pressing the foot switch 150 when the backhoe 300 starts to scoop earth and sand (denoted as "S"), when the backhoe 300 starts to load the earth and sand onto the dump truck (denoted as "L"), and when a sign is sent by a klaxon (denoted as "H").

When the training work is started, the movement measurement device 140 measures the movement amount related to the movement measurement device 140 itself, measures a time (for example, elapsed time from the reception of the measurement start instruction signal), and records the movement data in which the movement amount and the time information are associated with each other in the movement measurement device 140 itself. At this time, when the timing specifying signal output from the timing prediction device 110 due to the foot switch 150 being pressed is input to the movement measurement device 140, the movement measurement device 140 also records a timing at which the timing specifying signal is input to the movement measurement device 140 itself (step S101).

Specifically, during the training work, the control unit 142 of the movement measurement device 140 records, in the recording unit 143, the movement data in which the movement amount measured by the measurement unit 141 and the time information obtained by counting the time are associated with each other.

In the training work, when the occupant presses the foot switch 150 at timings of the above S, L, and H, the foot switch 150 outputs the switch signal. When the switch signal reception unit 111 of the timing prediction device 110 receives the switch signal from the foot switch 150, the switch signal reception unit 111 of the timing prediction device 110 outputs the switch information indicating that the switch signal is received to the timing specifying unit 112. When the switch information is received from the switch signal reception unit 111, the timing specifying unit 112 outputs the timing specifying signal to the movement measurement device 140.

When the movement measurement device 140 receives the timing specifying signal from the timing specifying unit 112 of the timing prediction device 110, the control unit 142 records the timing at which the timing specifying signal is received in the recording unit 143.

The movement data recorded in the recording unit 143 can be maintained after the training work. Specifically, for example, states of all actions of the backhoe 300 during the training work may be captured (including recording) by a video camera, and checking, correction, or the like of matching between times of scenes corresponding to the timings of S, L, and H in the captured video and the recorded sound and the specified timings of S, L, and H by the foot switch 150 may be performed, and labels indicating S, L, and H may be attached to the movement data. The maintenance described above may be performed manually by an operator, or may be automatically performed by executing an image recognition process and a sound recognition process on the captured video and the recorded sound by a computer.

In the training work, a process itself of recording the timing to the recording unit 143 by pressing the foot switch 150 may be omitted, and the S, L, and H labels may be attached by the captured video and the recorded sound obtained by the video camera described above.

FIGS. 4A and 4B are graphs showing examples of the movement data recorded by the recording unit 143 of the movement measurement device 140.

FIG. 4A is a graph of x-axis acceleration data [m/s²] with respect to an elapsed time [s] for each of the movement measurement device 140A, the movement measurement device 140B, and the movement measurement device 140C.

FIG. 4B is a graph of angular velocity data [deg/s] on a yaw angle with respect to the elapsed time [s] for each of the movement measurement device 140A, the movement measurement device 140B, and the movement measurement device 140C.

In both FIGS. 4A and 4B, the elapsed time is an elapsed time after the training work is started. In each of FIGS. 4A and 4B, an uppermost row "A" corresponds to the movement data of the movement measurement device 140A, a middle row "B" corresponds to the movement data of the movement measurement device 140B, and a lowermost row "C" corresponds to the movement data of the movement measurement device 140C.

A straight line (dashed-dotted line) perpendicular to a time axis (horizontal axis) shown in each of the graphs of FIGS. 4A and 4B indicates a timing at which the movement measurement device 140 receives the timing specifying signal, that is, at which the foot switch 150 is pressed. In addition, L, S, and H denoted near the respective straight lines represent labels attached by the maintenance.

According to FIGS. 4A and 4B, it can be seen that the respective movements of the cab 312B, the boom 321, and the arm 322 in each of an action in which the backhoe 300 scoops earth and sand, an action in which the backhoe 300 loads the scooped earth and sand, and an action in which the backhoe 300 sends a sign and stands by have characteristics.

The description will return to the flowchart of FIG. 3.

When the movement data for training is recorded in the recording unit 143 and the maintenance is ended as necessary, the control unit 142 of the movement measurement device 140 performs control so as to output the movement data recorded in the recording unit 143. When the movement data acquisition unit 113 of the timing prediction device 110 acquires the movement data from the movement measurement device 140, the acquired movement data is output to the feature generation unit 114. The feature generation unit 114 performs the frequency analysis on the movement data received from the movement data acquisition unit 113 to generates the time-series feature data, and outputs the generated feature data to the action analysis unit 115 (step S102).

Specifically, the feature generation unit 114 segments the data into time windows each having an action window length of N=128 (0.64 second) at a window interval of 64 (0.32 second) for each type of the acquired movement amount and each axis, and executes a fast Fourier transform process by applying a window function Hann window of Equation 1.

[Equation 1]

$$\text{hann}(n) = 0.5\left(1 - \cos\left(2\pi\frac{n}{N}\right)\right), 1 \leq n \leq N \quad (1)$$

FIG. 5 is a graph showing an example of frequency strengths obtained by the feature generation unit 114 executing the fast Fourier transform process.

The graph of FIG. 5 shows frequency strengths of three frequency components obtained by the feature generation unit 114 executing the fast Fourier transform process on the x-axis acceleration data measured by the movement measurement device 140B provided on the boom 321 of the backhoe 300. A horizontal axis represents the elapsed time [s] after the training work is started.

In the graph of FIG. 5, a dotted line is a graph of the frequency strength when the frequency component is 0 [Hz]. A broken line is a graph of the frequency strength when the frequency component is 1.5625 [Hz]. A solid line is a graph of the frequency strength when the frequency component is 3.1250 [Hz].

In the graph of FIG. 5, during a period in which the elapsed time is about 160 [s] to about 175 [s], the movement actions of the cab 312B, the boom 321, and the arm 322 of the backhoe 300 are stopped. During this movement action stop period, a gravity component appears in the frequency strengths of the frequency components of 0 [Hz] and 1.5625 [Hz]. A frequency strength due to this gravity component varies depending on directions of the boom 321 and the arm 322. That is, the feature generation unit 114 detects features of different accelerations depending on a posture of the backhoe 300 in a stationary state. This is not desirable since the stationary state can be segmented into a plurality of primitive actions in the segmentation process, which is a post-process, of the feature data performed by the action analysis unit 115.

In addition, depending on a relationship between a vibration generated by driving of an engine mounted on the backhoe 300 and an inherent resonance frequency of the backhoe 300, a superimposed component may appear in the frequency strength on the frequency component.

Therefore, in order to prevent the segmentation of the stationary state, the feature generation unit 114 extracts the frequency strength of the frequency component (3.1250 [Hz] in the example of FIG. 5) in which the frequency strength is the smallest in the stationary state of the backhoe 300 as the feature data of the acceleration.

In addition, the feature generation unit 114 compares the frequency components when the backhoe 300 is stationary and when the backhoe 300 operates, selects a frequency band including the frequency component generated due to the preparatory work action of the backhoe 300, and extracts the frequency strength in the selected frequency band.

That is, the feature generation unit 114 selects a frequency band including a frequency component in which a feature based on the movement actions of the cab 312B, the boom 321, and the arm 322 is larger than a feature based on an inherent vibration component of the backhoe 300, and extracts the frequency strength in the selected frequency band.

Since the angular velocity is not influenced by gravity as described above, the frequency strength of the frequency component of 0 [Hz] that greatly reflects the movement action of the backhoe 300 is extracted as the feature data of the angular velocity.

The description will return to the flowchart of FIG. 3 again.

When the feature generation unit 114 generates the time-series feature data, the action analysis unit 115 segments the feature data to extract the transition sequence of the primitive action, and causes the action model stored in the action model storage unit 116 to learn using the extracted transition sequence (step S103).

Specifically, the action analysis unit 115 segments the time-series feature data based on, for example, the NPHMM to extract the transition sequence of the primitive action, and causes the action model to learn using the extracted transition sequence.

Here, a swiveling action of the backhoe 300 is interposed between the action in which the backhoe 300 scoops earth and sand and the action in which the backhoe 300 loads the scooped earth and sand onto the dump truck, and this swiveling action may be a guide of switching the work. Therefore, in order to use a change in swiveling velocity for the timing prediction, the transition sequence may be rearranged and used by using, as a key, the feature data based on an angular velocity of a yaw angle measured by the movement measurement device 140A provided on the top surface of the cab 312B.

FIG. 6 is a graph showing an example of a transition of the primitive action in the action model stored in the action model storage unit 116.

The graph of FIG. 6 shows a state transition in which the movement of the backhoe 300 is segmented into 18 states. A horizontal axis represents the elapsed time [s] after the training work is started, and a vertical axis represents an ID (identification number) indicating the primitive action.

A straight line (dashed-dotted line) perpendicular to a time axis (horizontal axis) shown in the graph of FIG. 6 indicates the timing at which the movement measurement device 140 receives the timing specifying signal, that is, at which the foot switch 150 is pressed. In addition, L, S, and H denoted near the respective straight lines represent labels attached by the maintenance.

[Timing Prediction Process in Actual Action]

The timing prediction process in the actual action of the timing prediction system 100 will be described, and in the timing prediction system 100, the timing prediction device 110 in which the learning of the action model is ended is used. The backhoe 300 in the description of the present timing prediction process is an example of the observation object or the construction machine. The occupant of the backhoe 300 operates actual work related to the preparatory work action.

When the timing prediction device 110 and the movement measurement device 140 are powered on, the main body control unit of the timing prediction device 110 initializes the timing prediction device 110, and the control unit 142 of the movement measurement device 140 initializes the movement measurement device 140. When the main body control unit is set to the actual action mode by an external operation, the main body control unit cooperates with the control unit 142 to execute the timing prediction process in the actual action.

FIG. 7 is a flowchart that is executed by the timing prediction system 100 and shows an example of a schematic procedure of the timing prediction process in the actual action.

When the actual work related to the preparatory work action is started, the movement measurement device 140 measures the movement amount related to the movement measurement device 140 itself, measures a time (for example, elapsed time from the reception of the measurement start instruction signal), and outputs the movement data in which the movement amount and the time information are associated with each other to the timing prediction device 110 (step S111).

When the movement data acquisition unit 113 of the timing prediction device 110 acquires the movement data from the movement measurement device 140, the acquired movement data is output to the feature generation unit 114. The feature generation unit 114 performs the frequency analysis on the movement data received from the movement data acquisition unit 113 to generate the time-series feature data, and outputs the generated feature data to the action analysis unit 115 (step S112).

The action analysis unit 115 segments the feature data output from the feature generation unit 114 to extract the transition sequence of the primitive action, and outputs the extracted transition sequence to the prediction unit 117 (step S113).

The prediction unit 117 analyzes the occurrence rate of the primitive action in the preparatory work action of the backhoe 300 based on the transition sequence received from the action analysis unit 115 and the action model stored in the action model storage unit 116, and extracts the pattern of the primitive action. Then, the prediction unit 117 predicts the end timing of the preparatory work action based on the extracted pattern of the primitive action, and outputs the timing information indicating the predicted end timing to the output unit 118 (step S114).

A process of predicting the end timing of the preparatory work action by the prediction unit 117 will be specifically described.

The primitive action included in the transition sequence may appear in common in a series of work processes. For example, since both work of scooping earth and sand and work of leveling earth and sand around the backhoe 300 include the action of shoveling earth and sand, the primitive action included in the common action thereof appears in both work processes. Therefore, the prediction unit 117 divides the preparatory work action into, for example, the following three stages, and predicts a timing at which the preparatory work action ends by capturing the primitive action characterizing the action of each stage in stages.

First, labels are attached to timings of before the loading of earth and sand, during the loading of earth and sand, and other work.

The labels may be attached based on the switch signal received from the foot switch 150 pressed by the occupant of the backhoe 300 at a timing of starting the loading.

The preparatory work action of the backhoe 300 is divided into three stages of an action $f_1$ to an action $f_3$ based on the attached labels.

Action $f_1$: scooping earth and sand.
Action $f_2$: lifting the scooped earth and sand, while swiveling toward a planned loading position.
Action $f_3$: gradually decreasing the swiveling velocity toward the planned loading position.

The prediction unit 117 extracts a primitive action $q_k$ characterizing each action $f_k$ from the transition sequence related to the preparatory work action. In order to extract a prediction pattern common to all the preparatory work actions, i satisfying an appearance degree $p_{appe}(f_k, i)=1$ of Equation 2 is extracted as the primitive action $q_k$. Here, the number of actions $f_k$ in which i appears is n ($f_k$, i), and the total number of preparatory work actions is $N_A$.

[Equation 2]

$$p_{appe}(f_k, i) = \frac{n(f_k, i)}{N_A} \quad (2)$$

Next, the prediction unit 117 extracts a pattern S(bold type)$_{key}$ for identifying the end timing of the preparatory work action by using the primitive action $q_k$ characterizing the action $f_k$ of each stage of the preparatory work action. Note that the "(bold type)" means that a character "S" immediately in front of the "(bold type)" is expressed in bold form. A condition $O(q_k, q_{k+1})$ for connecting the primitive actions in the pattern S(bold type)$_{key}$ may be obtained by analyzing a state of the transition sequence output by the action analysis unit 115, or may be obtained by observing the transition sequence. When a primitive action $r_{ku}$ expressed by Equation 3 is used, the pattern S(bold type)$_{key}$ is expressed by the Equation 4.

[Equation 3]

$$r_{ku} \in O(q_k, q_{k+1}) \quad (3)$$

[Equation 4]

$$S_{key} = [q_1, r_{11}, r_{12}, \ldots, r_{1n}, q_2, r_{21}, r_{22}, q_3] \quad (4)$$

For the pattern S(bold type)$_{key}$, in order to evaluate accuracy of the prediction of the end timing of the preparatory work action, the prediction unit 117 determines a confidence $p_{conf}(k)$ for each stage g(k).

Specifically, the prediction unit 117 determines stages as follows for capturing the primitive actions in the pattern S(bold type)$_{key}$ by using a positive integer i.

Stage g(1): detecting $q_1$.
Stage g(2i): after stage g(2i−1), continuously detecting a primitive action satisfying $O(q_i, q_{i+1})$.
Stage g(2i+1): after stage g(2i), detecting a primitive action satisfying $q_i+1$.

Assuming that the number of processes of leveling earth and sand advanced to the stage g(k) is $n_B(k)$, the confidence $p_{conf}(k)$ that captures the end timing of the preparatory work action for each stage is expressed by Equation 5.

[Equation 5]

$$p_{conf}(k) = \frac{N_A}{n_B(k) + N_A} \quad (5)$$

The output unit 118 outputs the timing information received from the prediction unit 117 to the outside (step S115). For example, an information processing device may be connected to the output unit 118, and the timing information output by the output unit 118 may be acquired by the information processing device. The information processing device is, for example, a computer or a portable information terminal. The information processing device may calculate a predicted timing at which the preparatory work action ends or a time until the preparatory work action ends according to a timing corresponding to the confidence based on the acquired timing information, and may present this information to a user of the information processing device.

Next, a description will be given of a result of an experiment in which an action model is created and learns using learning movement amount data related to 12 sets of preparatory work actions, and the pattern S(bold type)$_{key}$ is extracted by using evaluation movement amount data related to other 4 sets of preparatory work actions. It should be noted that a total of 16 sets of preparatory work actions include 4 and 5 times of loading of earth and sand per set.

By causing the action model to learn based on the training movement amount data, 14 primitive actions are segmented from the time-series feature data related to the preparatory work action as shown in FIG. 8.

FIG. 8 is a graph showing an example of a transition of the primitive action by the action model learnt based on the training movement amount data. This graph represents a state transition in which the movement of the backhoe 300 related to the preparatory work action is segmented into 14 states. A horizontal axis represents the elapsed time [s] after the training work is started, and a vertical axis represents an ID (identification number) indicating the primitive action. As shown in the graph of FIG. 8, in the 12 sets of the present work, IDs of the primitive actions $q_1$, $q_2$, and $q_3$ satisfying an appearance rate $p_{appe}(f_k, i)=1$ in each action $f_k$ were detected to be 6, 2, and 11 (F(1), F(2), and F(3) in FIG. 8).

The condition $O(q_k, q_{k+1})$ between the primitive actions $q_k$ was observed as follows.

Condition $O(q_1, q_2)$: ID of primitive action $r_{1u}$ not smaller than $q_1$.

Condition $O(q_1, q_2)$: detecting $q_2$ a plurality of times. When the ID of the primitive action is smaller than $q_2$ by 2 or more, the ID of the primitive action $r_{2u}$ continues to decrease to $q_3$.

FIG. 9 is a graph showing an example of a relationship between a time prior to the end timing of the preparatory work action and the confidence. In the graph of FIG. 9, a horizontal axis represents a time [s] prior to an end timing (end time) when the end timing is set to 0 (zero), and a vertical axis represents the confidence.

The pattern S(bold type)$_{key}$ reflecting the condition O($q_k$, $q_{k+1}$) based on the training movement amount data has a relationship between the time prior to the timing at which the preparatory work action ends and the confidence as indicated by a broken line in FIG. 9. According to the broken line graph of FIG. 9, in a case based on the training movement amount data, the timing prediction device 110 predicts an end timing with a confidence of about 0.6 (probability of about 60%) from about 4.5 [s] before the end timing to about immediately before the end timing.

In addition, a result of predicting a timing at which 4 times of the preparatory work action end by using the pattern S(bold type)$_{key}$ extracted based on the evaluation movement amount data is as indicated by a solid line in FIG. 9. According to the solid line graph of FIG. 9, in a case based on the evaluation movement amount data, the timing prediction device 110 predicts an end timing with a confidence of about 0.67 (probability of about 67%) from about 6 [s] before the end timing to about 0.8 [s] before the end timing and an end timing with a confidence of 1 (probability of 100%) from about 0.8 [s] before the end timing to about immediately before the end timing.

As described above, in the present embodiment, the movement data of three positions on the backhoe 300 (observation object) performing the preparatory work action is acquired, the feature data is generated by performing the frequency analysis on the movement data, the transition sequence of the primitive action is extracted by segmenting the feature data, and based on the transition sequence and the action model obtained by learning the transition sequence of the primitive action obtained by segmenting the movement state of the backhoe 300 (training object) performing the movement action, the occurrence rate of the primitive action in the preparatory work action is analyzed to extract the pattern of the primitive action, thereby predicting the end timing of the preparatory work action.

According to such a configuration, it is possible to predict the end timing of the preparatory work action of the backhoe 300 (observation object) performing the movement action.

Further, in the present embodiment, the preparatory work action performed by the backhoe (observation object) is divided into three actions, for each divided action, the occurrence rate of the primitive action in the action is analyzed to extract the pattern of the primitive action based on the extracted transition sequence and the action model, the pattern is evaluated in stages to calculate the confidence, and the end timing of the preparatory work action is predicted according to the confidence.

In this manner, the pattern is evaluated in stages by focusing on the plurality of divided actions, so that the accuracy of the prediction of the end timing of the preparatory work action is improved.

The number of divisions required for the analysis for predicting the end timing of the preparatory work action is not limited to 3. The preparatory work action may not be divided, or the number of divisions may be determined according to a characteristic action included in the work, a structure related to the movement of the backhoe 300, or the like.

Further, in the present embodiment, by performing frequency analysis on the acquired movement data, the frequency band including the frequency component generated due to the preparatory work action is selected, and the feature data is generated in the selected frequency band.

According to such a configuration, for example, the frequency analysis of the movement amount of the backhoe 300 can be performed accurately and with high quality by eliminating or preventing an influence of the gravity component, the inherent vibration of the backhoe 300, or the like.

Further, in the present embodiment, the Hidden Markov Model is applied to the action model, and the transition sequence of the primitive action is extracted by segmenting the feature data by a calculation process to which the Hidden Markov Model is applied.

According to such a configuration, it is possible to extract fine action elements included in the preparatory work action of the backhoe 300 and capture a transition thereof in detail.

In the present embodiment, the movement data includes the angular velocity data and the acceleration data.

According to such a configuration, inertial data of the action of the backhoe 300 can be acquired, and the feature of the action can be efficiently and effectively extracted.

[First Modification]

The object to be scooped of the backhoe 300 is mainly earth and sand, but the action of the backhoe 300, particularly the action of the bucket 324, may be slightly different depending on a type of earth and sand to be handled. For example, there may be a difference in the action of the arm 322 or the bucket 324 between a case in which the object to be scooped having a relatively large mass per unit volume or a relatively large resistance force related to the scooping, such as a crushed stone, is handled and a case in which the object to be scooped having a relatively small mass per unit volume or a relatively small resistance force related to the scooping, such as a wood chip, is handled. In such a case, the action characterized by the object to be scooped is segmented and extracted as the primitive action.

Therefore, the prediction unit 117 may extract a feature of a large (basic or fundamental) action of scooping the object to be scooped and swiveling the scooped object, and execute an analysis process so as to ignore a small (auxiliary) action of finely adjusting the action according to the difference in object to be scooped.

By executing such an analysis process, the prediction unit 117 can predict the end timing of the preparatory work action without being influenced by the difference in object to be scooped. For example, the end timing of the preparatory work action can be predicted with a stable confidence regardless of whether light soil is mixed in earth and sand such as gravel or regardless of a magnitude of a ratio of the mixed light soil.

[Second Modification]

A construction machinery system may be implemented by mounting the timing prediction device 110 on a dump truck onto which earth and sand from the backhoe 300 is loaded. Specifically, the construction machinery system including the movement measurement device 140A, the movement measurement device 140B, and the movement measurement device 140C provided on the cab 312B, the boom 321, and the arm 322 of the backhoe 300, which is an example of the construction machine, and the timing prediction device 110 mounted on the dump truck may have the following configuration.

The information processing device is connected to the output unit 118 of the timing prediction device 110. An output device is connected to the information processing device. The information processing device may calculate the predicted timing at which the preparatory work action ends or the time until the preparatory work action ends according to the timing corresponding to the confidence based on the timing information acquired from the timing prediction device 110, and may present information on the calculated time to a driver of the dump truck by using the output device.

That is, the construction machinery system implements a reminder system (alarm system) that notifies the driver of the dump truck of prediction information that "loading from the backhoe 300 is started after several seconds".

As a specific example, a sound output device may be connected to the information processing device, and the information on the calculated time and announcement information indicating that loading preparation is completed may be subjected to a sound recognition process, so that the sound output device may output, for example, notice information by sound of "loading preparation is completed after * second".

As another specific example, a display device may be connected to the information processing device, and information such as text and graphics based on the information on the calculated time and the announcement information indicating that the loading preparation is completed may be displayed on the display device.

In this construction machinery system, the timing prediction device 110 may be mounted on the backhoe 300, and the information processing device and the output device may be mounted on the dump truck.

[Third Modification]

A series of actions in which the backhoe 300 levels earth and sand, scoops earth and sand, swivels, and loads earth and sand are repetitive actions. Therefore, as long as a series of movement amount data from the movement measurement device 140 is acquired by the information processing device, the information processing device statistically analyzes and recognizes postures of the boom 321 and the arm 322 based on the series of movement amount data, and calculates a position of the bucket 324 based on the recognized posture, it is possible to predict a loading position of the bucket 324.

Accordingly, a timing at which the loading preparation of the backhoe 300 ends and the loading position of the bucket 324 can be predicted, and autonomous driving of the dump truck can be supported.

The movement measurement device 140 may include a GPS to measure a position of the movement measurement device 140 itself by causing the GPS to receive positioning data from a satellite, and output position data obtained by the measurement. The position data includes, for example, information on latitude, longitude, and altitude. By acquiring the position data, the information processing device may calculate the position of the bucket 324 based on the position data.

The dump truck may also include a GPS. The movement measurement device 140 and the dump truck measure the respective positions and output the position data obtained by the measurement to the information processing device, so that the information processing device can acquire a relative distance between the bucket 324 and the dump truck and directions. Then, the information processing device can estimate a state in which the backhoe 300 performs the loading onto the dump truck based on the acquired relative distance and directions.

As a result, the accuracy of the end timing of the preparatory work action can be further improved.

According to the construction machinery system described above, during the action in which the backhoe 300 levels earth and sand, scoops earth and sand, swivels, and completes the loading preparation, the dump truck can be easily moved and stopped at the loading position until the loading preparation is completed, and efficient loading work can be implemented.

[Fourth Modification]

In addition, in the present embodiment, an example in which the movement measurement device 140 is provided at three positions of the cab 312B, the boom 321, and the arm 322 to measure the action of the backhoe 300 is described, but the provision position of the movement measurement device 140 is not limited in the present example. For example, the movement measurement device 140 may be provided at a position where the excavation or scooping is not hindered, such as an outer side surface of the bucket 324. The movement measurement device 140 may be further provided at a position between the bucket link 323 and the bucket 324 in addition to three positions of the cab 312B, the boom 321, and the arm 322.

As a result, it is possible to analyze a movement action of the bucket 324 while capturing a subtle action of the bucket 324.

FIG. 10 is a diagram showing an example of a schematic hardware configuration of a computer 1000 functioning as the timing prediction device 110. The computer 1000 according to the present embodiment includes a CPU periphery unit including a central processing unit (CPU) 1200, a random access memory (RAM) 1300, and a graphic controller 1400, which are connected to one another by a host controller 1100, and an input and output unit including a read only memory (ROM) 1600, a communication I/F (interface) 1700, a hard disk drive 1800, and an input and output chip 1900, which are connected to the host controller 1100 by an input and output controller 1500.

The CPU 1200 operates based on programs stored in the ROM 1600 and the RAM 1300, and controls each unit. The graphic controller 1400 acquires image data generated by the CPU 1200 or the like on a frame buffer provided in the RAM 1300, and displays the image data on a display. Alternatively, the graphic controller 1400 may include therein the frame buffer that stores the image data generated by the CPU 1200 or the like.

The communication I/F 1700 communicates with other devices via a network in a wired or wireless manner. The communication I/F 1700 functions as hardware that performs communication. The hard disk drive 1800 stores the programs and data used by the CPU 1200.

The ROM 1600 stores a boot program executed when the computer 1000 is operated, a program dependent on the hardware of the computer 1000, and the like. The input and output chip 1900 connects various input and output devices to the input and output controller 1500 via a parallel port, a serial port, a keyboard port, a mouse port, and the like.

A program provided to the hard disk drive 1800 via the RAM 1300 is stored in a recording medium such as an integrated circuit (IC) card and provided by a user. The program is read from the recording medium, installed in the hard disk drive 1800 via the RAM 1300, and executed by the CPU 1200.

The programs that are installed in the computer 1000 and cause the computer 1000 to function as the timing prediction device 110 may cause the CPU 1200 or the like to operate, and cause the computer 1000 to function as the units of the timing prediction device 110. Information processing codes described in these programs are read by the computer 1000, so that the computer 1000 functions as the switch signal reception unit 111, the timing specifying unit 112, the movement data acquisition unit 113, the feature generation unit 114, the action analysis unit 115, the action model storage unit 116, the prediction unit 117, and the output unit 118, which are specific units in which software and the above-described various hardware resources cooperate with one another. These specific units implement calculation or processing on information according to a use purpose of the computer 1000 in the present embodiment, thereby constructing the unique timing prediction device 110 according to the use purpose.

In the computer 1000, the host controller 1100, the CPU 1200, the RAM 1300, the graphic controller 1400, the input and output controller 1500, and the ROM 1600 may be implemented as a control unit 1001.

FIG. 11 is a diagram showing an example of a configuration of the control unit 1001 according to the modification. The control unit 1001 includes the host controller 1100, the CPU 1200, the RAM 1300, the graphic controller 1400, the input and output controller 1500, and the ROM 1600.

The CPU 1200, the graphic controller 1400, and the input and output controller 1500 read the programs stored in the RAM 1300, the ROM 1600, and the hard disk drive 1800 and execute the read programs, so that the computer 1000 (that is, the timing prediction device 110) functions as a device including the control unit 1001, the communication I/F 1700, the hard disk drive 1800, and the input and output chip 1900.

The CPU 1200, the graphic controller 1400, and the input and output controller 1500 read the programs stored in the RAM 1300, the ROM 1600, and the hard disk drive 1800 and execute the read programs, so that the control unit 1001 functions as a device including the timing specifying unit 112, the movement data acquisition unit 113, the feature generation unit 114, the action analysis unit 115, and the prediction unit 117. That is, the control unit 1001 includes the timing specifying unit 112, the movement data acquisition unit 113, the feature generation unit 114, the action analysis unit 115, and the prediction unit 117. The input and output chip 1900 and the communication I/F 1700 are examples of the switch signal reception unit 111.

The hard disk drive 1800 is an example of the action model storage unit 116. The hard disk drive 1800 is a computer-readable storage medium device such as a magnetic hard disk device or a semiconductor storage device.

The action model is obtained by learning the transition sequence of the primitive action as described above. Further, as described above, the Hidden Markov Model is applied to the action model, and the action model extracts the transition sequence of the primitive action by segmenting the feature data by the calculation process to which the Hidden Markov Model is applied. As described above, in the learning mode, the action analysis unit 115 inputs the transition sequence of the primitive action to the action model and causes the action model to learn. The action analysis unit 115 segments the time-series feature data in the actual action mode and extracts the transition sequence of the primitive action.

As described above, the Hidden Markov Model is an example of a method used to segment the time-series feature data and extract the transition sequence of the primitive action. Therefore, the action model is a mathematical model indicating a relationship between the time-series feature data and the transition sequence of the primitive action, and is a mathematical model (that is, a learning model) updated by a machine learning method in the learning mode. More specifically, an example of the method for extracting the transition sequence of the primitive action is a method of segmenting the time-series feature data by using a Markov chain Monte Carlo methods (MCMC) algorithm to which the Hidden Markov Model is applied. The Hidden Markov Model models a transition probability between the primitive actions.

Therefore, more specifically, the action model is a learning model that estimates the transition sequence of the primitive action based on the time-series feature data. The machine learning method may be unsupervised learning or supervised learning. For example, the above-described Hidden Markov Model may be an unsupervised Hidden Markov Model. When the machine learning method is the supervised learning, a data set is used for learning, and in the data set, learning data (that is, data on an explanatory variable side) is the time-series feature data and correct data (that is, data on an objective variable side) is the transition sequence of the primitive action.

In the actual action mode, the action analysis unit 115 uses the learnt action model to estimate the transition sequence of the primitive action based on the input time-series feature data. Therefore, the transition sequence of the primitive action estimated by the action analysis unit 115 is the transition sequence of the primitive action extracted as described above. The learnt learning model means that a predetermined ending condition for learning is satisfied. The predetermined ending condition is, for example, a condition that learning is performed a predetermined number of times. The predetermined ending condition may be, for example, a condition that a change in learning model by learning is smaller than a predetermined change.

Note that an update of the learning model means suitably adjusting a value of a parameter in the learning model. A process of the suitable adjustment is, for example, a process of reducing a predetermined loss. The loss is, for example, information indicating a difference between a result of the estimation using the learning model and the correct data.

The update of the learning model also means that a circuit representing the learning model, which is a circuit such as an electronic circuit, an electric circuit, an optical circuit, or an integrated circuit representing the learning model, is updated by learning. Updating the circuit by learning means updating a value of a parameter of the circuit. By updating the value of the parameter of the circuit representing the learning model, the value of the parameter of the learning model represented by the circuit is updated.

Note that the timing prediction device 110 does not necessarily have to execute actions in the learning mode. The timing prediction device 110 may be a device that does not execute the actions in the learning mode but executes actions in the actual action mode by using a learnt action model generated by an external device. Note that the timing prediction device 110 does not necessarily have to execute the actions in the actual action mode. The timing prediction device 110 may be a device that does not execute the actions in the actual action mode but executes the actions in the learning mode.

As described above, the movement measurement device 140 outputs the movement data in which the angular velocity data, the acceleration data, and the time information of each of the three axes are associated with one another. Therefore, the feature data generated by the feature generation unit 114 is, for example, 18 types of feature data obtained from each piece of movement data of 18-dimensional movement data. The 18-dimensional movement data is a total of 18 types of movement data indicating angular velocities and accelerations in three orthogonal axial directions for each of the arm 322, the boom 321, and the cab 312B. Hereinafter, a set of 18 types of feature data obtained from each piece of movement data of the 18-dimensional movement data will be referred to as an 18-dimensional feature data set.

A content of each element of the 18-dimensional feature data set will be described more specifically. 6 types of the 18 types of movement data are six types of feature data obtained from six types of movement data in total of the angular velocities and the accelerations in the three orthogonal axis directions of the arm 322. Hereinafter, each piece of the six types of feature data obtained from the six types of movement data in total of the angular velocities and the accelerations in the three orthogonal axis directions of the arm 322 is referred to as 6-dimensional arm feature data.

6 types of the 18 types of movement data are six types of feature data obtained from six types of movement data in total of the angular velocities and the accelerations in the three orthogonal axis directions of the boom 321. Hereinafter, each piece of the six types of feature data obtained from the six types of movement data in total of the angular velocities and the accelerations in the three orthogonal axis directions of the boom 321 is referred to as 6-dimensional boom feature data.

6 types of the 18 types of movement data are six types of feature data obtained from six types of movement data in total of the angular velocities and the accelerations in the three orthogonal axis directions of the cab 312B. Hereinafter, each piece of the six types of feature data obtained from the six types of movement data in total of the angular velocities and the accelerations in the three orthogonal axis directions of the cab 312B is referred to as 6-dimensional cab feature data.

In this manner, the 18-dimensional feature data set is a set of six types of 6-dimensional arm feature data, six types of 6-dimensional boom feature data, and six types of 6-dimensional cab feature data.

The 18-dimensional feature data is represented by, for example, a tensor having a total of 18 elements having values of 18 types of feature data as elements. The tensor having a total of 18 elements is, for example, an 18-dimensional vector.

The feature data generated by the feature generation unit 114 does not necessarily have to be 18 types of feature data of the 18-dimensional feature data set. The feature data generated by the feature generation unit 114 may be 3 types of feature data of a basic feature data set. The basic feature data set is a set of 3 types of feature data including 1-dimensional arm feature data, 1-dimensional boom feature data, and 1-dimensional cab feature data.

The 1-dimensional arm feature data is feature data obtained from movement data indicating an angular velocity of the arm 322 in a Z-axis direction. The 1-dimensional boom feature data is feature data obtained from movement data indicating an angular velocity of the boom 321 in the Z-axis direction. The 1-dimensional cab feature data is feature data obtained from movement data indicating an angular velocity of the cab 312B in the Z-axis direction.

The Z-axis direction of the arm 322 is a direction parallel to a rotation axis of a joint between the arm 322 and the boom 321. A center axis of the arm 322 is an axis connecting joints at both ends of the arm 322. Thus, the angular velocity of the arm 322 in the Z-axis direction is an angular velocity corresponding to a joint angle of the arm 322.

The Z-axis direction of the boom 321 is a direction parallel to a rotation axis of a joint between the boom 321 and the upper swiveling body 312. A center axis of the boom 321 is an axis connecting joints at both ends of the boom 321. Thus, the angular velocity of the boom 321 in the Z-axis direction is an angular velocity corresponding to a joint angle of the boom 321.

The Z-axis direction of the cab 312B is parallel to a rotation axis of the upper swiveling body 312. The center axis of the cab 312B is in a direction perpendicular to a ground surface on which the backhoe 300 is located. Thus, the angular velocity of the cab 312B in the Z-axis direction is an angular velocity corresponding to the joint angle of the cab 312B.

Therefore, a total of 3 types of angular velocities of the arm 322, the boom 321, and the cab 312B in the Z-axis direction are 3-dimensional angular velocities coaxial with the joint. As described above, each of the angular velocities of the arm 322, the boom 321, and the cab 312B in the Z-axis direction is an angular velocity of the movement generated by the movement action of the backhoe 300 and a rotational movement around a joint axis corresponding to the movement action.

For the arm 322, the corresponding joint axis is in the Z-axis direction of the arm 322. The Z-axis direction of the arm 322 is a direction parallel to a rotation axis of a joint between the arm 322 and the boom 321. For the boom 321, the corresponding joint axis is in the Z-axis direction of the boom 321. The Z-axis direction of the boom 321 is a direction parallel to a rotation axis of a joint between the boom 321 and the cab 312B. For the cab 312B, the corresponding joint axis is in the Z-axis direction of the cab 312B. The Z-axis direction of the cab 312B is a direction perpendicular to the ground surface on which the backhoe 300 is located or a direction parallel to a rotation axis of a joint between the cab 312B and the lower traveling body 311.

That is, the angular velocity of the arm 322 in the Z-axis direction is the angular velocity of the rotational movement of the arm 322 around the joint axis generated by the movement action of the backhoe 300. The angular velocity of the boom 321 in the Z-axis direction is the angular velocity of the rotational movement of the boom 321 around the joint axis generated by the movement action of the backhoe 300. The angular velocity of the cab 312B in the Z-axis direction is the angular velocity of the rotational movement of the cab 312B around the joint axis generated by the movement action of the backhoe 300.

The preparatory work action is an example of the movement action. Therefore, the three types of feature data of the basic feature data set generated by the feature generation unit 114 may be feature data obtained from movement data indicating an angular velocity of a movement generated by the movement action and having a component in the movement of the corresponding joint around the rotation axis. That is, the three types of feature data of the basic feature data set generated by the feature generation unit 114 may be angular velocities of rotational movements around respective joint axes of the arm 322, the boom 321, and the cab 312B generated by the movement action.

Since each of the angular velocities of the arm 322, the boom 321, and the cab 312B in the Z-axis direction is an angular velocity of the movement having a component in a vertical direction, each of the angular velocities of the arm 322, the boom 321, and the cab 312B in the Z-axis direction is highly likely to be influenced by a steering action as compared with angular velocities in other directions. A feature that strongly reflects the influence of the steering action enhances dependence of the steering action on the action model, and has an effect of preventing the action from being segmented by gravity, rocking of the machine, or the like.

Since the backhoe 300 is a device that performs mining, a frequency of performing actions in the Z-axis direction is higher than a frequency of performing actions in other directions. Therefore, the timing prediction device 110 can predict the end timing of the preparatory work action with higher accuracy by using 3 types of feature data of the basic feature data set instead of 18 types of feature data of the 18-dimensional feature data set. The reasons are as follows.

When the 18 types of feature data of the 18-dimensional feature data set are used as the feature data, information having a relatively weak influence of gravity is also used for the prediction of the timing prediction device 110. An amount of information itself is larger when the 18 types of feature data of the 18-dimensional feature data set are used as compared with when the 3 types of feature data of the basic feature data set are used. However, noise is mixed in the information. Therefore, as the number of pieces of information increases, the number of pieces of information on noise may be larger than the number of pieces of information on the influence of the steering action.

Since the number of pieces of information on noise may be larger than the number of pieces of information on the influence of the steering action, it is not always preferable that the number of types of the feature data used for the prediction of the timing prediction device 110 is larger. For this reason, the feature data used for the prediction of the timing prediction device 110 may be less than 18 types of feature data such as the 3 types of feature data of the basic feature data set, and may be more preferable than a case where the feature data is not less than the 18 types of feature data.

The feature data obtained from the acceleration among the 18 types of feature data of the 18-dimensional feature data set is more strongly influenced by the posture of the backhoe 300 and the posture of the movement measurement device 140 than the angular velocity. Therefore, the feature generation unit 114 does not necessarily need to generate the feature data obtained from the acceleration.

When the 3 types of feature data of the basic feature data set are used instead of the 18 types of feature data of the 18-dimensional feature data set, 18 types of movement data or only 3 types of movement data may be input to the feature generation unit 114. At least movement data indicating each angular velocity of a total of 3 types of angular velocities of the arm 322, the boom 321, and the cab 312B in the Z-axis direction may be input to the feature generation unit 114. Even if 18 types of movement data are input, the feature generation unit 114 may generate the 3 types of feature data of the basic feature data set using only the movement data indicating each angular velocity of a total of 3 types of angular velocities of the arm 322, the boom 321, and the cab 312B in the Z-axis direction.

An example of an experimental result of a first evaluation experiment performed using the timing prediction device 110 will be described. The first evaluation experiment was an experiment in which the accuracy of the prediction by the timing prediction device 110 was compared between a case where the 18 types of feature data of the 18-dimensional feature data set were used as the feature data and a case where the 3 types of feature data of the basic feature data were used.

FIG. 12 is a diagram showing an example of the experimental result of the first evaluation experiment according to the modification. FIG. 12 shows three experimental results of results D101, D102, and D103. The result D101 indicates a confidence of a result of the timing prediction device 110 predicting the end timing of the preparatory work action when an experienced operator A operates a small machine α. The result D102 indicates a confidence of a result of the timing prediction device 110 predicting the end timing of the preparatory work action when the experienced operator A operates a large machine β. The result D103 indicates a confidence of a result of the timing prediction device 110 predicting the end timing of the preparatory work action when an operator B who is inexperienced operates the large machine β. Both the small machine α and the large machine β are examples of the backhoe 300.

The experienced operator A was an operator having a cumulative operating time of 90 hours and an average time of a pre-loading action of (19.5±3.3) seconds. The operator B who is inexperienced was an operator having a cumulative operating time of 35 hours and an average time of the pre-loading action of (31.35±13.0) seconds.

The small machine α has an arm length of 10.1 meters and a bucket volume of 1.4 cubic meters, and swing during work is less than that of the large machine β. The large machine β has an arm length of 12.6 meters and a bucket volume of 2.8 cubic meters, and swing during work is larger than that of the small machine α.

$D_3$ indicates that the feature data used by the timing prediction device 110 is the 3 types of feature data of the basic feature data set. $D_{18}$ indicates that the feature data used by the timing prediction device 110 is the 18 types of feature data of the 18-dimensional feature data set.

Four data sets of a data set A, a data set B, a data set C, and a data set D will be described. Each of the four data sets is a part of data of 16 times of loading work performed in combination with the same operator and the same backhoe. In the experiment, data of 16 times of loading work was divided into four sets of a first set, a second set, a third set, and a fourth set by data of 4 times of loading work. That is, each of the first set, the second set, the third set, and the fourth set included the data of 4 times of loading work, and the different sets did not include the same data.

In the experiment, three sets of data among the first set to the fourth set were used as data used for learning, and a remaining one set of data was used for evaluation. A difference between the four data sets is a difference between a combination of the three sets used for the learning and the one set used for evaluation. That is, one of the four data sets is a data set in which data of the first set, the second set, and the third set is used for learning and data of the fourth set is used for evaluation. Another one of the four data sets is a data set in which data of the second set, the third set, and the fourth set is used for learning and data of the first set is used for evaluation. One of the four data sets is a data set in which data of the third set, the fourth set, and the first set is used for learning and data of the second set is used for evaluation. The remaining one of the four data sets is a data set in which data of the fourth set, the first set, and the second set is used for learning and data of the third set is used for evaluation.

As for the confidence, 1 is the maximum value, and a value closer to 1 indicates that a degree of the confidence is higher. That is, the closer the confidence is to 1, the higher the possibility that the prediction is correct.

The result D102 indicates that, when the feature data is the 18 types of feature data of the 18-dimensional feature data set, the timing prediction device 110 did not predict that the confidence is 1.0. On the other hand, the result D102 indicates that, when the feature data is the 3 types of feature data of the basic feature data set, the timing prediction device 110 predicted that the confidence is 1.0.

The results D101 to D103 indicate that, when the feature data used by the timing prediction device 110 is the 3 types of feature data of the basic feature data, the prediction of the confidence of 1.0 is performed in all of the results D101 to D103.

As described above, FIG. 12 indicates that the number of types of feature data is not necessarily large.

An example of an experimental result of a second evaluation experiment performed using the timing prediction device 110 will be described. In the second evaluation experiment, the 3 types of feature data of the basic feature data set were used as the feature data. The second evaluation experiment was an experiment for evaluating the accuracy of the prediction by the timing prediction device 110 in a case where a position posture of the inertial measurement unit in the actual action mode and a position posture of the inertial measurement unit at the time of acquisition of data used for learning in the learning mode were different. Specifically, the inertial measurement unit is the movement measurement device 140. Hereinafter, the inertial measurement unit means the movement measurement device 140. FIGS. 13 to 15 below are schematic diagrams for illustrating the second evaluation experiment.

FIG. 13 is a first schematic diagram illustrating the second evaluation experiment according to the modification. FIG. 13 shows an inertial measurement unit D1 and an inertial measurement unit D2. Arrangement of the inertial measurement unit D1 is an example of arrangement of the inertial measurement unit on the cab when the movement data used for learning in the learning mode is acquired. Arrangement of the inertial measurement unit D2 is an example of arrangement of the inertial measurement unit on the cab when the movement data used in the actual action mode is acquired. Directions of the inertial measurement unit D1 and the inertial measurement unit D2 are different from each other by 135°.

FIG. 14 is a second schematic diagram illustrating the second evaluation experiment according to the modification. FIG. 14 shows an inertial measurement unit D3 and an inertial measurement unit D4. Arrangement of the inertial measurement unit D3 is an example of arrangement of the inertial measurement unit on a side surface of the boom when the movement data used for training in the learning mode is acquired. Arrangement of the inertial measurement unit D4 is an example of arrangement of the inertial measurement unit on the side surface of the boom when the movement data used in the actual action mode is acquired. Directions of the inertial measurement unit D3 and the inertial measurement unit D4 are different from each other by 135°.

FIG. 15 is a third schematic diagram illustrating the second evaluation experiment according to the modification. FIG. 15 shows an inertial measurement unit D5 and an inertial measurement unit D6. Arrangement of the inertial measurement unit D5 is an example of arrangement of the inertial measurement unit on a side surface of the arm when the movement data used for training in the learning mode is acquired. Arrangement of the inertial measurement unit D6 is an example of arrangement of the inertial measurement unit on the side surface of the arm when the movement data used in the actual action mode is acquired. The inertial measurement unit D5 and the inertial measurement unit D6 are disposed at different positions. Specifically, the inertial measurement unit D6 was disposed at a position 1 meter away from the inertial measurement unit D5.

FIG. 16 is a diagram showing an example of an experimental result of the second evaluation experiment according to the modification. More specifically, FIG. 16 shows an example of a result in a case where the arrangement of the inertial measurement unit at the time of acquiring the movement data is different between the learning mode and the actual action mode. In the second evaluation experiment, a loading time was three times. The loading time is a time during which the backhoe 300 is in a state of being capable of loading earth and sand onto the dump truck. Therefore, the loading time is a timing at which the dump truck is directed to the backhoe 300 and is a timing to be predicted. Therefore, the three times of loading times mean three times of timings to be predicted. The result of FIG. 16 is a result in which performance when the timing prediction device 110 predicts the loading time is represented by the confidence. FIG. 16 shows that the confidence is 1.0 in all of the data sets A to D.

FIG. 16 shows that, when the basic feature data is used as the feature data, the timing prediction device 110 can perform prediction with a high confidence even if there is a difference in the arrangement of the inertial measurement unit between the learning mode and the actual action mode. This is because the feature data reflecting the posture is reduced as described above. The reduction means not using. Therefore, FIG. 16 shows that robustness of the timing prediction device 110 with respect to the difference in the arrangement of the inertial measurement unit between the learning mode and the actual action mode is increased by reducing the feature data reflecting the posture.

The prediction unit 117 may execute the following key action extraction process as a process of extracting the primitive action $q_k$ (hereinafter, referred to as a "key action $q_k$") characterizing an action from the transition sequence of the primitive action extracted by the action analysis unit 115. In the key action extraction process, $q_k$ defined by the following Equation 6 is extracted as the key action $q_k$.

[Equation 6]

$$\frac{n_L(q_k)}{N_L} = 1 \, \&\& \, {}^{(i)}t_{q_k} < {}^{(i)}t_{q_k+1} \tag{6}$$

$N_L$ represents a total number of pre-loading actions in the training data. $N_L(q_k)$ represents a total number of key actions $q_k$ appearing in the pre-loading. ${}^{(i)}t_{q_k}$ represents a time at which the key action $q_k$ appears in an i-th action among the pre-loading actions.

In the key action extraction process, the prediction unit 117 estimates $q_k$ that satisfies Equation 6 based on the transition sequence of the primitive action. The prediction unit 117 acquires the $q_k$ estimated in the above manner as the key action.

After the key action extraction process, the prediction unit 117 executes a pattern acquisition process. The pattern acquisition process is a process of acquiring a time average S(bold type) of an occurrence probability of a transition between the key actions in order to identify a transition satisfying the following constraint condition as the end timing of the preparatory work action.

For more specific description of the pattern acquisition process, a maximum time length $l_{q_k}q^{k+1}$ between the key actions and a minimum value $th_{q_k}^{q_k+1}$ of the time average ${}^{(i)}S_{q_k}^{q_k+1}(t)$ of the appearance probability of the transition between the key actions will be described.

The minimum value $th_{q_k}^{q_{k+1}}$ and the time average $^{(i)}S_{q_k}^{q_{k+1}}(t)$ are defined by the following Equations 7 to 10.

[Equation 7]

$$th_{q_k}^{q_{k+1}} = \min_i\left(\min_t(^{(i)}S_{q_k}^{q_{k+1}}(t))\right) \quad (7)$$

[Equation 8]

$$^{(i)}S_{q_k}^{q_{k+1}}(t) = \sum_{t_0 = ^{(i)}t_{q_k}} O_{q_k}^{q_{k+1}}(z_{t_0}, z_{t_0+1})/t \quad (8)$$

[Equation 9]

$$O_{q_k}^{q_{k+1}} = \sum_{i=1}^{N_L} {}^{(i)}F_{q_k}^{q_{k+1}}/N_L \quad (9)$$

[Equation 10]

$$^{(i)}F_{q_k}^{q_{k+1}}(j,k) = \begin{cases} 1, & ^{(i)}n_{q_k}^{q_{k+1}}(j,k) > 0 \\ 0, & ^{(i)}n_{q_k}^{q_{k+1}}(j,k) = 0 \end{cases} \quad (10)$$

$^{(i)}F_{qk}^{q_{k+1}}(j, k)$ is a matrix indicating the presence or absence of a transition from an action of an action identifier j to an action of an action identifier k in a period from a time $^{(i)}t_{qk}$ to a time $^{(i)}t_{qk+1}$. The action identifier is an identifier for distinguishing key actions from each other. A definition of $z_{t0}$ is a primitive action detected at a time t0. A definition of $z_{t0+1}$ is a primitive action detected at a time (t0+1).

$^{(i)}n_{qk}^{q_{k+1}}(j, k)$ is a total number of the appearances of the transitions from the action of the action identifier j to the action of the action identifier k in the period from the time $^{(i)}t_{qk}$ to the time $^{(i)}t_{qk+1}$.

In the pattern acquisition process, the prediction unit 117 provides $l_{qk+1}^{qk}$ in order to cope with a case where a primitive action that is not included in the model is interposed between the key action $q_k$ and the key action $q_{k+1}$. The provision of the $l_{qk+1}^{qk}$ means that, after obtaining a time at which a transition to the key action $q_{k+1}$ is made based on the key action $q_k$ obtained by segmenting the loading, the maximum value of the time is set as a threshold. Setting information means that information is recorded in a storage device such as the RAM 1300, the ROM 1600, or the hard disk drive 1800. The recording is performed by, for example, the CPU 1200.

Corresponding means that prediction in the pre-loading functions. Note that functioning means that the process is executed by the prediction unit 117. In the pattern acquisition process, next, when the prediction unit 117 finds the key action in a motif at the same time as in the model, a process of determining that the same pre-loading actions are performed is executed. Hereinafter, a section is defined as a period from the time $^{(i)}t_{qk}$ to the time $^{(i)}t_{qk+1}$. The section is a period in which the key action of the motif found by the prediction unit 117 occurs.

The definition of $l_{qk+1}^{qk}$ is the maximum time from the detection of the key action $q_k$ to the detection of the key action q ('k+1). The definition of the key action $q_{k+1}$ is a definition of a key action appearing next to the key action $q_k$ in time series. In the pattern acquisition process, the prediction unit 117 next sets a threshold $l_{qk+1}^{qk}$ of a time (hereinafter, referred to as a "search time") for searching for these corresponding key actions. As described above, the setting information means that the information is recorded in the storage device such as the RAM 1300, the ROM 1600, or the hard disk drive 1800. The recording is performed by, for example, the CPU 1200. In the pattern acquisition process, the prediction unit 117 next searches for a corresponding key action within the time (that is, search time) based on the threshold $l_{qk+1}^{qk}$. In the pattern acquisition process, the prediction unit 117 next predicts the pre-loading action.

The constraint condition will be described. The constraint condition is a condition that the time average $^{(i)}S_{qk}^{q_{k+1}}(t)$ of the appearance probability of the primitive action between the key action $q_k$ and the key action $q_{k+1}$ is larger than the minimum value $th_{qk}^{q_{k+1}}$.

In the pattern acquisition process, the prediction unit 117 determines that an observed action is not a pre-loading work process when there are many transitions of the primitive action in which transitions that exceed the maximum time length $l_{qk+1}^{qk}$ between the key actions and do not match that in the model are observed. There being many transitions means that a transition occurs so as to satisfy the condition that the time average S is larger than the minimum value th.

On the other hand, even when the key action $q_{k+1}$ is not detected by the HMM model based on the learning data beyond the time $t_{qk}+l_{qk+1}^{qk}$, if the transition of the primitive action is close to the transition between the key actions, in the pattern acquisition process, the prediction unit 117 determines that the constraint condition applies to the condition that the observed action is the pre-loading work process. The transition of the primitive action close to the transition between the key actions means that a degree of the time average S of the appearance probability of the primitive action being larger than th is small. As described above, the prediction unit 117 uses the constraint condition in the pattern acquisition process, so that the timing prediction device 110 can cope with the pre-loading work process longer than that of the model.

In the pattern acquisition process, the prediction unit 117 acquires the transition satisfying the constraint condition in this manner as the pattern S(bold type).

The prediction unit 117 executes a confidence acquisition process after the execution of the key operation extraction process and the pattern acquisition process. The confidence acquisition process is a process of acquiring the confidence based on the pattern S(bold type) acquired in the pattern acquisition process. The confidence acquired in the confidence acquisition process may be expressed by the above-described Equation 5, or may be expressed by, for example, the following Equation 11.

[Equation 11]

$$p_{conf}(k) = \frac{n_p(P_2)}{n_p(P_1) + N_p(P_2)} \quad (11)$$

$n_p(P_1)$ represents a number when the time at which the $q_k$ is detected is the time of standby or soil collection. $n_p(P_2)$ represents a number when the time at which the $q_k$ is detected is immediately before the loading time of a prediction target. $N_p(P_2)$ represents a total number of loading times of the prediction target.

When the confidence is equal to or greater than a predetermined value, the prediction unit 117 estimates that a current timing is the loading time. The current timing is a timing when the prediction unit 117 determines that the confidence is equal to or greater than the predetermined value. The predetermined value is, for example, 1 when the confidence is defined by Equation 5 or Equation 11. The prediction unit 117 executes the key action extraction process, the pattern acquisition process, the confidence acquisition process, and a loading timing estimation process in the learning mode and the actual action mode.

FIG. 17 is a flowchart illustrating an example of a flow of processes executed in the pattern acquisition process, the confidence acquisition process, and the loading timing estimation process according to the modification. In FIG. 17, for simplicity of description, the flow of processes executed in the pattern acquisition process, the confidence acquisition process, and the loading timing estimation process will be described by taking a case where the confidence is the confidence defined by Equation 11 as an example.

The prediction unit 117 updates the time to t+1 (step S201). Next, the prediction unit 117 acquires a primitive $z_t$ (step S202). A definition of the primitive $z_t$ is a primitive action estimated at the time t. Next, the prediction unit 117 determines whether k is equal to or greater than 1 and $l_{qk}^t$ is greater than $l_q^{qk+1}$ (step S203).

When k is equal to or greater than 1 and $l_{qk}^t$ is greater than $l_{qk}^{qk+1}$ (step S203: YES), the prediction unit 117 determines whether $S_{qk}^{qk+1}(t)$ is equal to or greater than $th_{qk}^{qk+1}$ (step S204). When $S_{qk}^{qk+1}(t)$ is equal to or greater than $th_{qk}^{qk+1}$ (step S204: YES), the prediction unit 117 determines whether $z_t$ is equal to $q_{k+1}$ (step S205). When $z_t$ is equal to $q_{k+1}$ (step S205: YES), the prediction unit 117 updates the value of the identifier k of the key action to k+1 (step S206). Next, the prediction unit 117 determines whether the confidence is equal to 1 (step S207). When the confidence is equal to 1 (step S207: YES), the prediction unit 117 estimates that the timing at which the confidence satisfies 1 is the loading time (step S208). After step S208, the process returns to step S201.

On the other hand, when the condition that k is equal to or greater than 1 and $l_{qk}^t$ is greater than $l_{qk}^{qk+1}$ is not satisfied (step S203: NO), the process proceeds to step S205. When the condition that $S_{qk}^{qk+1}(t)$ is equal to or greater than $th_{qk}^{qk+1}$ is not satisfied (step S204: NO), the prediction unit 117 updates the value of the identifier k of the key action to 0 (step S209). When $z_t$ is not equal to $q_{k+1}$ (step S205: NO), the process returns to step S201. When the confidence is not equal to 1 (step S207: NO), the process returns to step S201.

The flow of the process of FIG. 17 is ended when the predetermined ending condition is satisfied. The predetermined ending condition is, for example, a condition that power supply of the timing prediction system 100 in FIG. 17 is turned off.

An example of an experimental result of a third evaluation experiment performed using the timing prediction device 110 will be described. The third evaluation experiment was an experiment for evaluating the accuracy of the prediction by the timing prediction device 110. In the prediction unit 117 in the third evaluation experiment, the prediction unit 117 executes the key action extraction process, the pattern acquisition process, the confidence acquisition process, and the loading timing estimation process in the modification. In the third evaluation experiment, the 3 types of feature data of the basic feature data set were used as the feature data. In the third evaluation experiment, four data sets were used.

FIG. 18 is a diagram showing an example of an experimental result of the third evaluation experiment according to the modification. FIG. 18 shows a result of prediction by the timing prediction device 110 and a result of prediction by three types of methods to be compared in the modification. One of the three methods to be compared is a threshold method, one is an LSTM (pattern recognition), and one is an LSTM (regression prediction). In the information on the prediction performed by the timing prediction device 110 in the modification, a row of "method" is a column of "timing prediction device".

FIG. 18 shows the accuracy, a reproduction rate, and the confidence for each of the results of prediction obtained by these four methods. The confidence used in the experiment was the confidence defined by Equation 11. FIG. 18 shows that the timing prediction device 110 according to the modification can perform prediction with an accuracy twice or more than other methods. FIG. 18 shows that the reproduction rate of the timing prediction device 110 according to the modification is about the same as that of the other methods. FIG. 18 shows that the confidence of the timing prediction device 110 according to the modification is twice or more than the other methods. Numerical values in FIG. 18 are average values of values obtained from prediction results for the four data sets used in the third evaluation experiment.

As described above, the prediction accuracy and the confidence of the timing prediction device 110 according to the modification are higher than those of the other methods, and the reproduction rate is the same as that of the other methods. Therefore, the timing prediction device 110 according to the modification implemented as described above can perform the prediction with a high accuracy.

Although the invention is described above using the embodiment, the technical scope of the invention is not limited to the scope described in the above embodiment. It is apparent to those skilled in the art that various modifications or improvements can be made to the above embodiment. It is apparent from the description of the claims that such modified or improved embodiments can also be included in the technical scope of the invention.

It should be noted that the execution order of the processes such as the operations, procedures, steps, and stages in the devices, systems, programs, and methods shown in the claims, the specification, and the drawings may be implemented in any order unless otherwise specified as "before", "prior to", or the like, and the previous process is used in the subsequent process. Even if the operation flow in the claims, the specification, and the drawings is described using "first", "next", and the like for the sake of convenience, it does not mean that implementation in this order is essential.

REFERENCE SIGN LIST 100 timing prediction system
110 timing prediction device
111 switch signal reception unit
112 timing specifying unit
113 movement data acquisition unit
114 feature generation unit
115 action analysis unit
116 action model storage unit
117 prediction unit
118 output unit
140 movement measurement device
140A movement measurement device
140B movement measurement device
140C movement measurement device 141 measurement unit
142 control unit
143 recording unit
150 foot switch
300 backhoe
310 main body
311 lower traveling body
312 upper swiveling body
312A swiveling frame
312B cab
320 backhoe attachment
321 boom
322 arm
323 bucket link
324 bucket
325 bucket cylinder
1001 control unit

The invention claimed is:

1. A method comprising:
receiving, from at least one sensor attached to construction machinery, movement data for a plurality of positions of the construction machinery performing a predetermined movement action, wherein the at least one sensor comprises at least one of a gyroscope, an acceleration sensor, or an inertial movement unit;
generating feature data by performing frequency analysis on the movement data;
segmenting the feature data to extract a transition sequence of a primitive action; and
predicting an end timing of the predetermined movement action by:
analyzing an occurrence rate of the primitive action in the predetermined movement action; and
extracting a pattern of the primitive action based on the extracted transition sequence and based on an action model, wherein the action model is obtained by determining a transition sequence of a primitive action obtained by segmenting a movement state of a training object performing a second movement action; and
causing at least one of an audible alarm or a visual alarm to be provided to a user, wherein the at least one of the audible alarm or the visual alarm is based on the predicted end timing of the predetermined movement action.

2. The method according to claim 1, wherein;
the predetermined movement action performed by the construction machinery is divided into a plurality of actions,
for each divided action, the occurrence rate of the primitive action in the action is analyzed to extract the pattern of the primitive action based on the extracted transition sequence and the action model,
the extracted pattern is evaluated in stages to calculate a confidence, and
the end timing of the predetermined movement action is predicted according to the calculated confidence.

3. The method according to claim 1, wherein generating the feature data by performing the frequency analysis comprises:
selecting a frequency band comprising a frequency component generated based on the predetermined movement action; and
generating the feature data the selected frequency band.

4. The method according to claim 1, wherein a Hidden Markov Model is applied to the action model, and wherein extracting the transition sequence of the primitive action comprises extracting the transition sequence by segmenting the feature data using a calculation process to which the Hidden Markov Model is applied.

5. The method according to claim 1, wherein the movement data comprises angular velocity data and acceleration data.

6. An apparatus comprising:
a processor; and
memory storing instructions that, when executed by the processor, cause the apparatus to:
store an action model obtained by learning a transition sequence of a primitive action obtained by segmenting a movement state of a training object performing a movement action;
receive, from at least one sensor attached to construction machinery, movement data of a plurality of positions of the construction machinery performing a predetermined movement action, wherein the at least one sensor comprises at least one of a gyroscope, an acceleration sensor, or an inertial movement unit;
generate feature data by performing frequency analysis on the movement data;
segment the feature data to extract a transition sequence of a primitive action;
predict an end timing of the predetermined movement action by analyzing an occurrence rate of the primitive action in the predetermined movement action and extracting a pattern of the primitive action based on the transition sequence and the action model; and
cause at least one of an audible alarm or a visual alarm to be provided to a user, wherein the at least one of the audible alarm or the visual alarm is based on the predicted end timing of the predetermined movement action.

7. A system comprising:
at least one sensor attached to construction machinery and configured to measure movements of the construction machinery and to generate movement data for a plurality of positions of the construction machinery performing a predetermined movement action, wherein the at least one sensor comprises at least one of a gyroscope, an acceleration sensor, or an inertial movement unit; and
a device comprising a processor and memory storing instructions that, when executed by the processor, cause the device to:
store an action model obtained by learning a transition sequence of a primitive action obtained by segmenting a movement state of a training object performing a movement action,
receive the movement data,
generate feature data by performing frequency analysis on the movement data,
segment the feature data to extract a transition sequence of a primitive action,
predict an end timing of the predetermined movement action by analyzing an occurrence rate of the primitive action in the predetermined movement action and extracting a pattern of the primitive action based on the transition sequence and the action model, and
cause at least one of an audible alarm or a visual alarm to be provided to a user, wherein the at least one of the audible alarm or the visual alarm is based on the predicted end timing of the predetermined movement action.

8. A non-transitory computer-readable medium storing instructions that, when executed, cause a computer to:

receive, from at least one sensor attached to construction machinery, movement data of a plurality of positions of the construction machinery performing a predetermined movement action, wherein the at least one sensor comprises at least one of a gyroscope, an acceleration sensor, or an inertial movement unit;

generate feature data by performing frequency analysis on the movement data;

segment the generated feature data to extract a transition sequence of a primitive action;

predict an end timing of the predetermined movement action by analyzing an occurrence rate of the primitive action in the predetermined movement action and extracting a pattern of the primitive action based on the extracted transition sequence and a predetermined action model, wherein the action model is obtained by learning a transition sequence of a primitive action obtained by segmenting a movement state of a training object performing a movement action; and cause at least one of an audible alarm or a visual alarm to be provided to a user, wherein the at least one of the audible alarm or the visual alarm is based on the predicted end timing of the predetermined movement action.

9. A system comprising:

at least one sensor attached to first construction machinery and configured to measure movement data of a plurality of positions of the first construction machinery performing a predetermined movement action, wherein the at least one sensor comprises at least one of a gyroscope, an acceleration sensor, or an inertial movement unit; and a device comprising a processor and memory storing instructions that, when executed by the processor, cause the device to:

store an action model obtained by learning a transition sequence of a primitive action obtained by segmenting a movement state of training construction machinery performing a movement action, receive the movement data, generate feature data by performing frequency analysis on the movement data, segment the feature data and extract a transition sequence of a primitive action, predict an end timing of the predetermined movement action by analyzing an occurrence rate of the primitive action in the predetermined movement action and extracting a pattern of the primitive action based on the transition sequence and the action model, and cause autonomous movement of second construction machinery to be performed based on the predicted end timing of the predetermined movement action of the first construction machinery.

10. The method according to claim 1, wherein the movement data indicates an angular velocity of a movement generated by the movement action and having a component in a rotational movement around each joint axis of an arm, a boom, and a cab of the construction machinery.

* * * * *